(12) United States Patent
Uchiyama

(10) Patent No.: US 9,397,353 B2
(45) Date of Patent: Jul. 19, 2016

(54) FUEL CELL SYSTEM

(75) Inventor: Tomoaki Uchiyama, Sunto-gun (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 58 days.

(21) Appl. No.: 14/235,497

(22) PCT Filed: Sep. 15, 2011

(86) PCT No.: PCT/JP2011/005224
§ 371 (c)(1),
(2), (4) Date: Jan. 28, 2014

(87) PCT Pub. No.: WO2013/038453
PCT Pub. Date: Mar. 21, 2013

(65) Prior Publication Data
US 2014/0178778 A1     Jun. 26, 2014

(51) Int. Cl.
*H01M 8/04291*     (2016.01)
*H01M 8/04*     (2016.01)
*H01M 8/10*     (2016.01)

(52) U.S. Cl.
CPC ........ *H01M 8/04291* (2013.01); *H01M 8/0485* (2013.01); *H01M 8/04365* (2013.01); *H01M 8/04529* (2013.01); *H01M 8/04552* (2013.01); *H01M 2008/1095* (2013.01); *Y02E 60/50* (2013.01)

(58) Field of Classification Search
CPC .................... H01M 8/04291; H01M 8/04365; H01M 8/04529; H01M 8/04552; H01M 8/0485
See application file for complete search history.

(56) References Cited

U.S. PATENT DOCUMENTS

| 6,524,733 | B1* | 2/2003 | Nonobe | H01M 8/04119 429/413 |
| 2002/0106537 | A1* | 8/2002 | Saito | H01M 8/04007 429/413 |
| 2007/0265802 | A1 | 11/2007 | Pettit et al. | |
| 2013/0323540 | A1 | 12/2013 | Matsusue | |

FOREIGN PATENT DOCUMENTS

| JP | 2004-127809 A | 4/2004 |
| JP | 2006-179199 A | 7/2006 |
| JP | 2007-311348 A | 11/2007 |

(Continued)

*Primary Examiner* — Ula C Ruddock
*Assistant Examiner* — Thomas Parsons
(74) *Attorney, Agent, or Firm* — Sughrue Mion, PLLC

(57) ABSTRACT

The object is to suppress degradation of the durability of an electrolyte membrane caused by deformation by expansion and contraction of the electrolyte membrane. A controller 150 calculates a humidity P of an electrolyte membrane 112 based on a cell resistance value (step S11) and determines whether the humidity P of the electrolyte membrane 112 is less than a humidity threshold A (step S12). When the humidity P is less than the humidity threshold A, the controller 150 determines that a dimensional change rate of the electrolyte membrane is not greater than a predetermined value and performs a process of increasing the humidity of the electrolyte membrane 112 (step S13). The predetermined value is a dimensional change rate that is unlikely to have damage by drying stress. This enables the electrolyte membrane 112 to be humidified before the electrolyte membrane 112 is excessively dried and thereby suppresses tensile stress from being applied to the electrolyte membrane 112 by drying of the electrolyte membrane 112. Accordingly this suppresses cracking and thinning of the electrolyte membrane 112 and improves the durability of the electrolyte membrane 112.

12 Claims, 14 Drawing Sheets

(56) References Cited

FOREIGN PATENT DOCUMENTS

| JP | 2008-4431 A | 1/2008 |
|---|---|---|
| JP | 2008-47368 A | 2/2008 |
| JP | 2009-59512 A | 3/2009 |
| JP | 2009-245826 A | 10/2009 |
| JP | 2010-257882 A | 11/2010 |
| JP | 2011-253755 | 12/2011 |
| JP | 2012-054119 | 3/2012 |
| JP | 2012-084264 | 4/2012 |
| WO | 2012/111046 | 8/2012 |

* cited by examiner

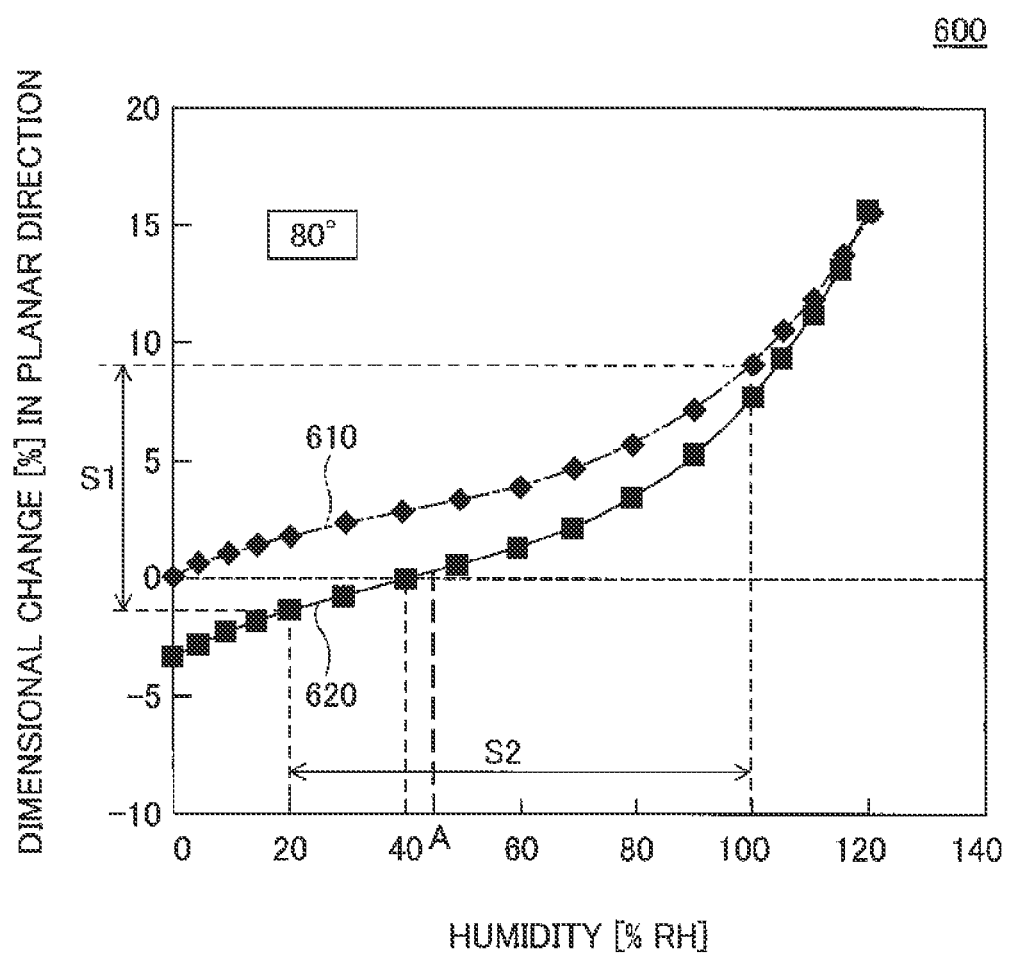

FUEL CELL SYSTEM

CROSS REFERENCE TO RELATED APPLICATIONS

This application is a National Stage of International Application No. PCT/JP2011/005224 filed Sep. 15, 2011, the contents of which are incorporated herein by reference in their entirety.

TECHNICAL FIELD

The present invention relates to a fuel cell system and more specifically to control of the wet state of an electrolyte membrane of a fuel cell.

BACKGROUND ART

A known fuel cell system includes solid polymer electrolyte membranes having good proton conductivity in the wet sate. This fuel cell system predicts the water content state of the electrolyte membrane and performs humidification and drying of the electrolyte membrane, in order to suppress the dry-up and flooding and improve the power generation performance of the fuel cell.

CITATION LIST

Patent Literature

[PTL 1] JP 2009-245826A
[PTL 2] JP 2010-257882A

SUMMARY OF INVENTION

Technical Problem

The prior art, however, performs humidification control of the electrolyte membrane based on the power generation performance of the electrolyte membrane and does not take any consideration of a stress applied to the electrolyte membrane according to the water content state of the electrolyte membrane. In the prior art humidification control, in the course of a change in water content state of the electrolyte membrane from the wet state to the dry state, tensile stress acts on the electrolyte membrane. This may cause cracking or thinning of the electrolyte membrane and degrade the durability of the electrolyte membrane.

By taking into account the above problem, the object of the invention is to suppress degradation of the durability of an electrolyte membrane caused by deformation by expansion and contraction of the electrolyte membrane.

Solution to Problem

In order to solve at least part of the problems described above, the invention provides aspects and embodiments described below.

[Aspect 1] A fuel cell system comprising: a fuel cell configured to have a solid polymer electrolyte membrane; and a controller configured to control the fuel cell, wherein the controller controls wet state of the electrolyte membrane such that a dimensional change rate in a planar direction accompanied with expansion or contraction of the electrolyte membrane is equal to or greater than a predetermined value.

The fuel cell system according to Aspect 1 controls the wet state of the electrolyte membrane, such that the dimensional change rate in the planar direction accompanied with expansion and contraction of the solid polymer electrolyte membrane is equal to or greater than the predetermined value. Control of the wet state includes, for example, a humidifying process of increasing the water content of the electrolyte membrane and a drying process of decreasing the water content of the electrolyte membrane. This accordingly suppresses cracking and thinning of the electrolyte membrane caused by drying tensile stress, thus improving the durability of the electrolyte membrane.

[Aspect 2] The fuel cell system according to Aspect 1, wherein the predetermined value is 0%.

The fuel cell system according to Aspect 2 controls the wet state of the electrolyte membrane, such that the dimensional change rate of the electrolyte membrane becomes equal to or greater than 0%. This accordingly suppresses tensile stress from being applied to the electrolyte membrane by excessive drying of the electrolyte membrane. This suppresses cracking and thinning of the electrolyte membrane and improves the durability of the electrolyte membrane.

[Aspect 3] The fuel cell system according to Aspect 1, wherein the predetermined value is −1.5%.

The fuel cell system according to Aspect 3 controls the tensile stress acting on the electrolyte membrane to be ⅕ of the yield stress. The resin material is unlikely to be damaged by the tensile stress that is about 1.5 of the yield stress. This accordingly improves the durability of the electrolyte membrane.

[Aspect 4] The fuel cell system according to either one of Aspects 2 and 3, wherein the controller controls the wet state of the electrolyte membrane, such that the dimensional change rate is equal to or greater than the predetermined value and equal to or less than +9.0%.

The fuel cell system according to Aspect 4 controls the wet state when the dimensional change rate is equal to or greater than the predetermined value and equal to or less than 9.0%. This improves the power generation efficiency of the fuel cell system, while omitting unnecessary control.

[Aspect 5] The fuel cell system according to Aspect 1, wherein the predetermined value is specified by the dimensional change rate within a predetermined range including the dimensional change rate of the electrolyte membrane equal to 0%.

The fuel cell system according to Aspect 5 controls the wet state of the electrolyte membrane when the dimensional change rate of the electrolyte membrane is with the predetermined range including 0%. This accordingly suppresses tensile stress from being applied to the electrolyte membrane by excessive drying of the electrolyte membrane. This suppresses cracking and thinning of the electrolyte membrane and improves the durability of the electrolyte membrane.

[Aspect 6] The fuel cell system according to any one of Aspects 1 to 5, further comprising: an acquirer configured to obtain information on humidity of the electrolyte membrane, wherein the controller controls the wet state of the electrolyte membrane when the humidity is equal to or less than a first threshold value, and the first threshold value is specified by a humidity range of the electrolyte membrane when the dimensional change rate of the electrolyte membrane is −1.5% to +9%.

The fuel cell system according to Aspect 6 humidifies the electrolyte membrane when the humidity of the electrolyte membrane is equal to or less than the first threshold value. The first threshold value is specified by the humidity range of the electrolyte membrane when the dimensional change rate of the electrolyte membrane is in the range of −1.5% to +9%. The humidity of the electrolyte membrane is correlated to the dimensional change rate of the electrolyte membrane. When the humidity decreases below the first threshold value, the electrolyte membrane may be deformed and damaged by drying. This controls the wet state of the electrolyte membrane before application of tensile stress or under application of a tensile stress that is unlikely to damage the electrolyte membrane, thus suppressing the electrolyte membrane from being damaged.

[Aspect 7] The fuel cell system according to Aspect 6, wherein the first threshold value differs by temperature, the fuel cell system further comprising: a temperature detector configured to detect temperature of the electrolyte membrane, wherein the controller additionally changes the first threshold value, based on temperature of the fuel cell.

The fuel cell system according to Aspect 7 changes the first threshold value according to the temperature of the electrolyte membrane. This accordingly enables the control process of the wet state of the electrolyte membrane to be performed based on the adequate first threshold value according to the temperature of the electrolyte membrane. This improves the durability of the electrolyte membrane and suppresses degradation of the power generation performance and the fuel consumption of the fuel cell by unnecessarily performing the control process of the wet state.

[Aspect 8] The fuel cell system according to either one of Aspects 6 and 7, wherein the controller controls the wet state of the electrolyte membrane when a state that the humidity of the electrolyte membrane is equal to or less than the first threshold value continues for a predetermined time.

The fuel cell system according to Aspect 8 controls the wet state of the electrolyte membrane when the state that the humidity of the electrolyte membrane is equal to or less than the first threshold value continues for the predetermined time. Because of the viscoelastic property of the electrolyte membrane, it takes a certain time to actually apply tensile stress to the electrolyte membrane after the humidity of the electrolyte membrane becomes equal to or less than the first threshold value. There is accordingly the predetermine time prior to a start of the control process of the wet state of the electrolyte membrane after the humidity of the electrolyte membrane becomes equal to or less than the first threshold value. The control of the wet state of the electrolyte membrane is not performed within the predetermined time. This omits the control process of the wet state for the predetermined time. As a result, this suppresses degradation of the power generation efficiency of the fuel cell and the energy loss associated with the control process of the wet state, thus improving the fuel consumption of the fuel cell.

[Aspect 9] The fuel cell system according to Aspect 8, wherein the predetermined time is specified based on at least one of a change in humidity of the electrolyte membrane per unit time and a humidity of the electrolyte membrane after the change in humidity.

The fuel cell system according to Aspect 9 specifies the predetermined time, based on at least one of the change in humidity of the electrolyte membrane per unit time and the humidity of the electrolyte membrane after the change in humidity. In the case of a small change in humidity of the electrolyte membrane per unit time or in the case of a relatively high humidity of the electrolyte membrane after the change in humidity, there is a longer time period from the time when the humidity of the electrolyte membrane becomes equal to or less than the first threshold value to the time when a tensile strain of the electrolyte membrane is generated by the tensile stress. This enables flexible setting of the predetermined time from the time when the humidity of the electrolyte membrane becomes equal to or less than the first threshold value to the time when the humidification control starts. This accordingly suppresses degradation of the power generation efficiency of the fuel cell and the energy loss associated with the humidification control and improves the fuel consumption of the fuel cell.

[Aspect 10] The fuel cell system according to Aspect 1, further comprising: a voltage detector configured to detect voltage of the fuel cell, wherein the controller controls the wet state of the electrolyte membrane when the voltage is equal to or greater than a second threshold value, and the second threshold value is a voltage of the fuel cell when the dimensional change rate of the electrolyte membrane is −1.5% to +9%.

The voltage of the fuel cell is correlated to the cell resistance value of the fuel cell, and the resistance value of the cell is correlated to the humidity of the electrolyte membrane. Accordingly the voltage of the fuel cell is correlated to the humidity of the electrolyte membrane via the cell resistance value. The fuel cell system according to Aspect 10 controls the wet state of the electrolyte membrane when the voltage of the fuel cell is equal to or greater than the second threshold value, which is the voltage of the fuel cell when the dimensional change rate of the electrolyte membrane is −1.5% to +9%. Accordingly, this readily suppresses tensile stress caused by drying of the electrolyte membrane from being applied to the electrolyte membrane, based on the voltage.

[Aspect 11] The fuel cell system according to Aspect 10, wherein the second threshold value differs by temperature, the fuel cell system further comprising: a temperature detector configured to detect temperature of the electrolyte membrane, wherein the controller additionally changes second first threshold value, based on temperature of the fuel cell.

The fuel cell system according to Aspect 11 changes the second threshold value according to the temperature of the electrolyte membrane. This enables the humidifying process of the electrolyte membrane to be performed based on the adequate second threshold value according to the temperature of the electrolyte membrane, thus improving the durability of the electrolyte membrane.

[Aspect 12] The fuel cell system according to any one of Aspects 1 to 11, wherein the controller controls a parameter relating to power generation performance of the fuel cell, so as to control the wet state of the electrolyte membrane.

The fuel cell system according to Aspect 12 controls the parameter relating to the power generation performance of the fuel cell, so as to control the wet state of the electrolyte membrane. This enables the wet state to be controlled quickly and readily without requiring any additional structure for controlling the wet state of the electrolyte membrane.

[Aspect 13] In a fuel cell system comprising an electrolyte membrane, a control method of controlling wet state of the electrolyte membrane, the control method comprising: obtaining a dimensional change rate in a planar direction accompanied with expansion and contraction of the electrolyte membrane; and controlling the wet state of the electrolyte membrane, such that the dimensional change rate of the electrolyte membrane is equal to or greater than a predetermined value.

The humidification control method according to Aspect 13 controls the wet state of the electrolyte membrane, such that the dimensional change rate of the electrolyte membrane is equal to or greater than the predetermined value. This accordingly suppresses tensile stress from being applied to the electrolyte membrane by drying of the electrolyte membrane. This suppresses cracking and thinning of the electrolyte membrane and improves the durability of the electrolyte membrane.

Any of the various aspects described above may be adequately combined or partly omitted in applications of the invention.

BRIEF DESCRIPTION OF THE DRAWINGS

FIG. 3 is a dimensional change graph 600 showing the correlation between the humidity of the electrolyte membrane 112 and the dimensional change rate according to the first embodiment;

DESCRIPTION OF EMBODIMENTS

A. First Embodiment

A1. Cell Structure

Figure 1A:
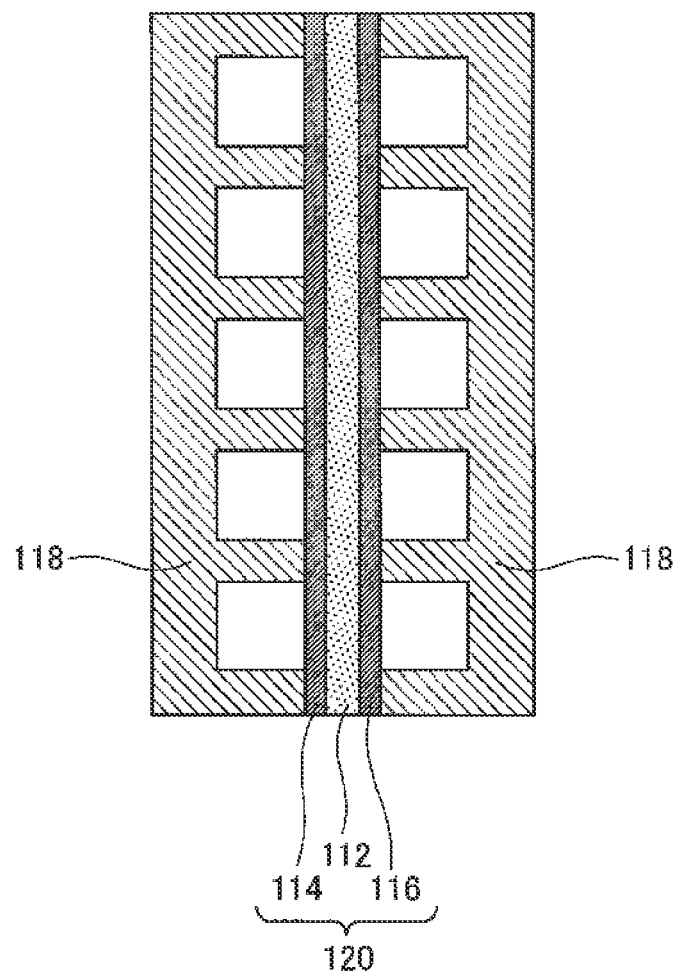
FIGS. 1A and 1B are diagrams illustrating the general structure of a cell 110 according to a first embodiment.
Figure 1B:
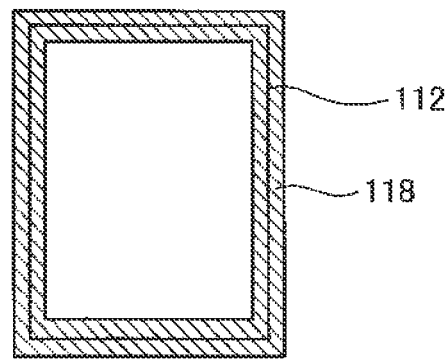

FIGS. 1A and 1B are diagrams illustrating the general structure of a cell 110 according to a first embodiment. FIG. 1A is a schematic cross sectional view of the cell 110, and FIG. 1B is a diagram illustrating a state that an electrolyte membrane is fixed by separators. The cell 110 includes a membrane electrode assembly (MEA) 120 and separators 118 placed both sides of the membrane electrode assembly 120. In the description below, the membrane electrode assembly 120 is shown as MEA 120. The MEA 120 includes an electrolyte membrane 112, an anode catalyst layer (anode catalyst electrode layer) 114 provided on one side of the electrolyte membrane 112, and a cathode catalyst layer (cathode catalyst electrode layer) 116 provided on the other side of the electrolyte membrane 112. In the description below, the anode catalyst layer 114 and the cathode catalyst layer 116 are collectively called as "catalyst electrode layer" or "catalyst layer".

The electrolyte membrane 112 is a solid polymer electrolyte membrane made of a fluorinated sulfonic acid polymer as the solid polymer material (for example, Nafion (registered trademark) membrane: NRE212) and has good proton conductivity in the wet state. The electrolyte membrane 112 is, however, not limited to Nafion but another fluorinated sulfonic acid membrane such as Aciplex (registered trademark) or Flemion (registered trademark) may be employed for the electrolyte membrane 112. Additionally, a fluorinated phosphonic acid membrane, a fluorinated carboxylic acid membrane, a fluorinated hydrocarbon graft membrane, a hydrocarbon graft membrane or an aromatic membrane may be used for the electrolyte membrane 112. A composite polymer membrane of the enhanced mechanical properties including a reinforcing material such as PTFE or polyimide is also usable. The electrolyte membrane 112 has the property that the dimension is changed by swelling and shrinkage accompanied with a change in moisture condition. In the description hereof, the dimension of the electrolyte membrane 112 means the dimension in the planar direction of the electrolyte membrane 112, in other words, the area of the electrolyte membrane 112. The dimensional change means the area change.

Figure 2A:
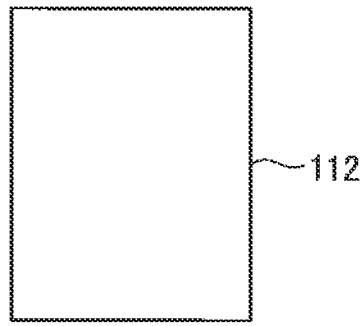
FIGS. 2A to 2C are schematic diagrams illustrating a dimensional change of the electrolyte membrane 112 accompanied with a change in moisture condition.
Figure 2B:
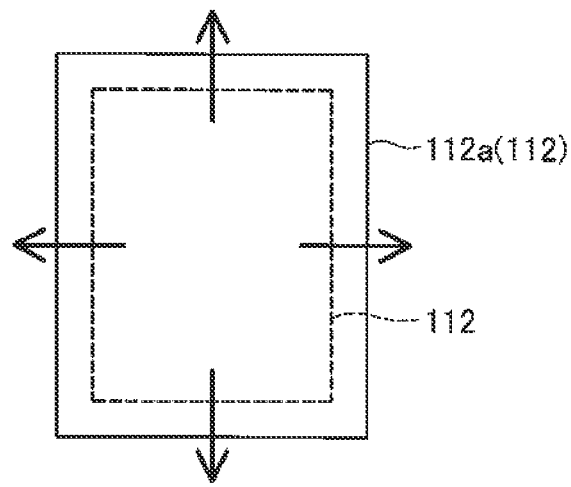
Figure 2C:
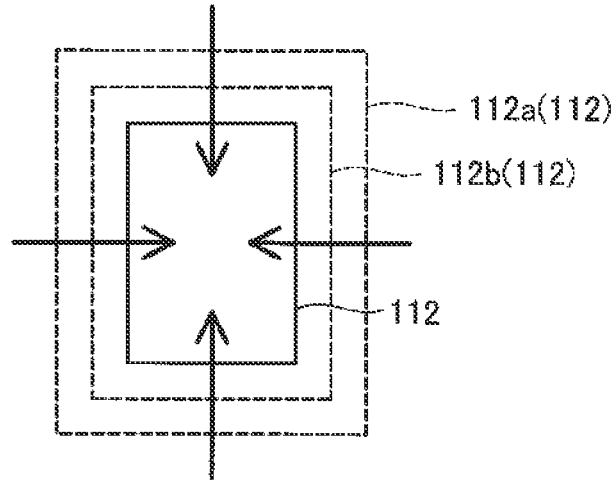

FIGS. 2A to 2C are schematic diagrams illustrating a dimensional change of the electrolyte membrane 112 accompanied with a change in moisture condition. FIG. 2A shows an initial state where the electrolyte membrane 112 is in the state at the time of manufacture (before product shipment); FIG. 2B shows a wet electrolyte membrane 112a humidified and swollen; and FIG. 2C shows a dry electrolyte membrane 112b after being dried from the wet state. The electrolyte membrane 112 shown by the broken line in FIGS. 2B and 2C indicates the area of the electrolyte membrane 112 in the initial state shown in FIG. 2A. Humidifying the electrolyte membrane 112 from the initial state shown in FIG. 2A causes an area increase as shown by the arrows in FIG. 2B and provides the electrolyte membrane 112a. Drying the swollen electrolyte membrane 112a of the increased area dimension causes contraction as shown by the arrows in FIG. 2C and decreases the area to be smaller than the electrolyte membrane 112 of FIG. 2A to provide the electrolyte membrane 112b. The correlation between the water content (humidity) of the electrolyte membrane 112 and the dimensional change will be described later in detail.

Referring back to FIG. 1, the catalyst layers 114 and 116 are layers to provide a catalyst for accelerating electrode reactions and are made of a material including an electrically conductive carrier having a catalyst supported thereon and an ionomer as an electrolyte. Available examples of the electrically conductive carrier include: carbon material such as carbon black, carbon nanotube and carbon nanofiber; and carbon compounds such as silicon carbide. For example, platinum, a platinum alloy, palladium, rhodium, gold, silver, osmium or iridium may be used as the catalyst. The platinum alloy used herein may be an alloy of platinum and at least one species selected among aluminum, chromium, manganese, iron, cobalt, nickel, gallium, zirconium, molybdenum, ruthenium, rhodium, palladium, vanadium, tungsten, rhenium, osmium, iridium, titanium and lead. Available examples of the ionomer include perfluorosulfonic acid resin material (for example, Nafion); sulfonated plastic electrolytes such as sulfonated polyether ketone, sulfonated polyethersulfone, sulfonated polyether ether sulfone, sulfonated polysulfone, sulfonated polysulfide, sulfonated polyphenylene; and sulfoalkylated plastic electrolytes such as sulfoalkylated polyether ether ketone, sulfoalkylated polyethersulfone, sulfoalkylated polyether ether sulfone, sulfoalkylated polysulfone, sulfoalkylated polysulfide and sulfoalkylated polyphenylene.

The separators 118 are made of a gas-impermeable but electrically conductive dense material, for example, compression-molded dense carbon, metal or electrically conductive resin. A fuel gas flow path is formed on a face of the separator 118 in contact with the anode catalyst layer 114, and an oxidizing gas flow path is formed on a face of the separator 118 in contact with the cathode catalyst layer 116.

FIG. 1B schematically illustrates a state that the electrolyte membrane 112 is fixed by the separators 118. A hatched area in FIG. 1B indicates peripheral contact areas of the pair of separators 118 with the electrolyte membrane 112. For convenience of explanation, the electrolyte membrane 112 is illustrated to have substantially the same area as the area of the separators 118 in FIG. 1A. As shown in FIG. 1B, however, the electrolyte membrane 112 actually has a slightly smaller area than that of the separators 118, and the pair of separators 118 are arranged to hold the outer periphery of the electrolyte membrane 112 placed therein. Such arrangement of the electrolyte membrane 112 and the separators 118 enables the electrolyte membrane 112 to be fixed by the separators 118 and subjected to restriction of dimension in the planar direction.

The cell 110 may additionally include an anode-side diffusion layer provided on the opposite side of the anode catalyst layer 114 which is opposite to the side in contact with the electrolyte membrane 112, and a cathode-side diffusion layer provided on the opposite side of the cathode catalyst layer 116 which is opposite to the side in contact with the electrolyte membrane 112. The anode-side diffusion layer and the cathode-side diffusion layer are layers serving to diffuse reactive gases (oxidizing gas and fuel gas) used for the electrode reactions along the plane direction of the MEA 120 and may be made of, for example, carbon cloth or carbon paper and treated by water repellent treatment with PTFE resin.

A2. Dimensional Change Rate of Electrolyte Membrane

FIG. 3 is a dimensional change graph 600 showing the correlation between the humidity of the electrolyte membrane 112 and the dimensional change rate according to the first embodiment. The dimensional change graph 600 shows the results of measurement of the dimensional change rate (area change rate) of the electrolyte membrane 112 during repetition of state transitions from the wet state to the dry state or from the dry state to the wet state by repeating the humidifying process and the drying process of the electrolyte membrane 112 at a predetermined temperature (80° C. in the first embodiment). In the dimensional change graph 600, the ordinate shows the dimensional change rate (unit: %) of the electrolyte membrane 112, and the abscissa shows the humidity (unit: % RH) of the electrolyte membrane 112. A dimensional change curve 610 shows a dimensional change tendency of the electrolyte membrane 112 in a first state transition, and a dimensional change curve 620 shows a dimensional change tendency of the electrolyte membrane 112 in a second or subsequent state transition. The dimensional change rate according to the first embodiment shows a ratio of area change by expansion or contraction of the area of the electrolyte membrane 112 to a reference area on the basis of a certain state of the electrolyte membrane 112 (having the dimensional change rate of 0%). The dimensional change rate increases from 0% with area expansion (increase), while decreasing from 0% with area contraction (decrease). According to the first embodiment, the tensile stress acting on the electrolyte membrane 112 is calculated based on the elasto-plasticity of the electrolyte membrane 112 by Expression 1:

$$\lambda = \left(1 + RH^2 \times 0.00002325 \times \frac{(T-30)}{30}\right) \times$$
$$(0.00001422 \times RH^3 - 0.00189737 \times RH^2 + 0.13414 \times RH)$$

(Expression 1)

In the dimensional change graph 600, the state having the dimensional change of the electrolyte membrane 112 equal to 0% is the state at the time of manufacture (before product shipment) of the electrolyte membrane 112 and corresponds to the initial state shown in FIG. 2A. The electrolyte membrane 112 is produced to have a specified shape and a specified dimension (FIG. 2A) at the humidity of 0%, so that a residual stress of the stress acting on the electrolyte membrane 112 in the manufacturing process is present in the electrolyte membrane 112. The molecular chain of the electrolyte membrane 112 is fixed in the imbalanced state by the residual stress. In an experiment of measuring the dimensional change rate, in a first humidifying process, the electrolyte membrane 112 is soaked in liquid water and is humidified to saturate the water content of the electrolyte membrane 112. At this moment, the molecular chain of the electrolyte membrane 112 is loosened, and the residual stress is relieved. Accordingly, the dimensional change tendency of the electrolyte membrane 112 from the humidified state to the dried state after the stress relaxation is expressed by the dimensional change curve 620. In the electrolyte membrane 112 incorporated in a fuel cell, however, the residual stress is gradually relieved through repetition of absorbing water produced by power generation of the fuel cell and drying. In this case, the dimensional change in multiple state transitions in the initial stage is expressed by the dimensional change curve 610. According to the dimensional change tendency expressed by the dimensional change curve 610, the dimensional change rate does not decrease below 0% in the initial stage of state transitions, so that no tensile stress acts on the electrolyte membrane 112.

As shown by the dimensional change curve 610, when the electrolyte membrane 112 is humidified from the initial state (FIG. 2A), the humidity is increased to increase the area in the planar direction as shown in FIG. 2B and thereby increase the dimensional change rate from 0%. The water content of the electrolyte membrane 112 reaches saturation level at the humidity of 120% RH. The dimensional change rate of the electrolyte membrane 112 in this state is +15.8%. In other words, the area of the electrolyte membrane 112 is expanded and increased by 15.8% from the initial state (FIG. 2A).

When the electrolyte membrane 112 is dried from the humidified and expanded state of FIG. 2B, as shown by the dimensional change curve 620, the electrolyte membrane 112 is shrunk to contract the area, and the dimensional change rate of the electrolyte membrane 112 is gradually decreased. The molecular chain of the electrolyte membrane 112 is loosened at the water content reaching saturation, so that the drying process causes the electrolyte membrane 112 to be further shrunk from the initial state shown in FIG. 2A, and the dimensional change rate decreases below 0% (negative state) as shown in FIG. 2C. When the electrolyte membrane 112 is excessively dried to the humidity of 0%, the dimensional change rate of the electrolyte membrane 112 is −3.6%. In other words, the area of the electrolyte membrane 112 is contracted by 3.6% from the initial state (FIG. 2A).

In the cell 110 of the first embodiment, the edge of the electrolyte membrane 112 is fixed by the separators 118 in the state of the dimensional change rate of 0%. In the course of shrinkage at the dimensional change rate of less than 0%, tensile stress (drying stress) acts on the electrolyte membrane 112. This tensile stress causes a morphological change (e.g., cracking or thinning). More specifically, when the electrolyte membrane 112 is excessively dried, tensile stress caused by drying-induced shrinkage acts on the electrolyte membrane 112. When the tensile stress exceeding the allowable limit of the electrolyte membrane 112 acts on the electrolyte membrane 112, the electrolyte membrane 112 may be cracked or thinned, which may result in degradation of the durability of the electrolyte membrane 112. According to the first embodiment, in order to suppress the tensile stress exceeding the allowable limit of the electrolyte membrane 112 from being applied to the electrolyte membrane 112 by excessive drying, control of humidifying the electrolyte membrane 112 is performed before application of the tensile stress exceeding the allowable limit of the electrolyte membrane 112. In the description hereof, the tensile stress allowable by the electrolyte membrane 112 means the level that is unlikely to cause damage such as cracking or thinning of the electrolyte membrane 112 even under application of the tensile stress. According to the first embodiment, the electrolyte membrane 112 is unlikely to have damage by the tensile stress when the dimensional change rate is within a change rate range S1 (−1.5% to 9%) or when the humidity of the electrolyte membrane 112 is within a humidity range S2 (20% RH to 100% RH). Specification of the change rate range S1 and the humidity range S2 will be described later in detail. The change rate range S1 corresponds to the "predetermined range" in the claims.

A3. General Configuration of Fuel Cell System

Figure 4:
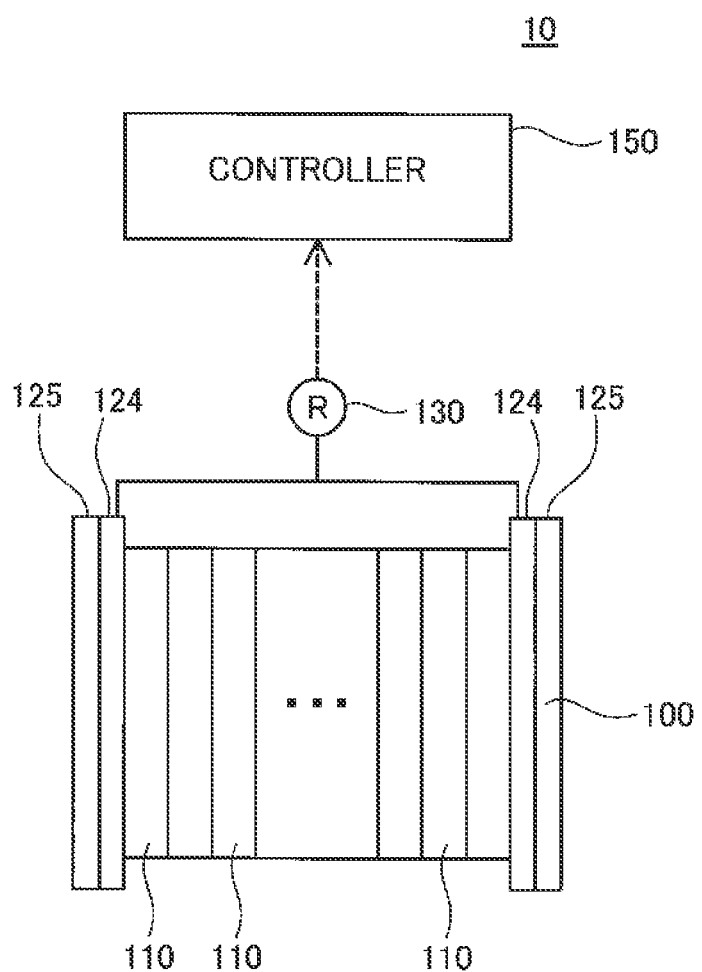
FIG. 4 illustrates the general configuration of a fuel cell system according to the first embodiment.

FIG. 4 illustrates the general configuration of a fuel cell system according to the first embodiment. The fuel cell system 10 of the first embodiment includes a fuel cell stack 100, a controller 150 and a resistance measurement unit 130.

The fuel cell stack 100 is a polymer electrolyte fuel cell and includes a plurality of cells 110 (described in FIG. 1), terminals 124 and end plates 125. In the fuel cell stack 100, the terminals 124 and the end plates 125 are arranged to hold the plurality of stacked cells 110 from both ends in a stacking direction.

The resistance measurement unit 130 is connected with the terminals 124 to measure the resistance of the fuel cell stack 100. The resistance measurement unit 130 detects the AC current flowing between both the terminals 124 and thereby measures the AC impedance of the fuel cell stack 100. The resistance measurement unit 130 may be connected with any of the respective cells 110 constituting the fuel cell stack 100. When the resistance measurement unit 130 is connected with any cell, it is preferable, for example, to be connected with a cell 110 of the highest resistance value under the same conditions among the respective cells 110. The higher resistance value results in the lower power generation efficiency and the smaller amount of water produced by power generation. The cell of the higher resistance value is accordingly expected to be more easily dried, compared with the cell of the lower resistance value. The resistance measurement unit 130 corresponds to the "acquirer" in the claims. As long as the humidity of the electrolyte membrane 112 is detectable, any of various techniques may be employed, in place of the resistance measurement unit 130.

The controller 150 controls the operating state of the fuel cell stack 100 according to the external demand and the measured values. The controller 150 performs a wet state control process of controlling the wet state of the electrolyte membranes 112, based on the humidity of the electrolyte membranes 112 placed in the fuel cell stack 100 and the dimensional change rate calculated from the humidity, as one of operating state controls. More specifically, the wet state of the electrolyte membrane 112 is controlled by controlling a parameter relating to power generation performance of the fuel cell stack 100, in order to make the dimensional change rate of the electrolyte membrane 112 equal to or greater than a predetermined value. The parameter relating to the power generation performance may be, for example, the current value or the temperature of the cell, the flow rate of the reactive gas or the back pressure. The wet state control process will be described later in detail.

According to the first embodiment, the binding load is applied to the respective cells 110 in the stacking direction of the fuel cell stack 100, so that the binding force by friction acts on the electrolyte membranes 112 placed in the respective cells 110 and no further shrinkage from the initial state shown in FIG. 2A is logically expected. There is, however, a portion where the binding force by the binding load does not sufficiently act, due to a distribution of contact pressure in the cell plane or a distribution of thickness of the constitutional member of the cell. In such a portion, the electrolyte membrane 112 is likely to have a dimensional change according to the water content condition. This may result in degradation of the durability of the electrolyte membrane 112 as described above. The controller 150 accordingly humidifies the electrolyte membrane 112 and reduces shrinkage by drying before application of the tensile stress unallowable by the electrolyte membrane 112 to the electrolyte membrane 112, thereby suppressing degradation of the durability of the electrolyte membrane 112.

A4. Wet State Control Process

Figure 5:
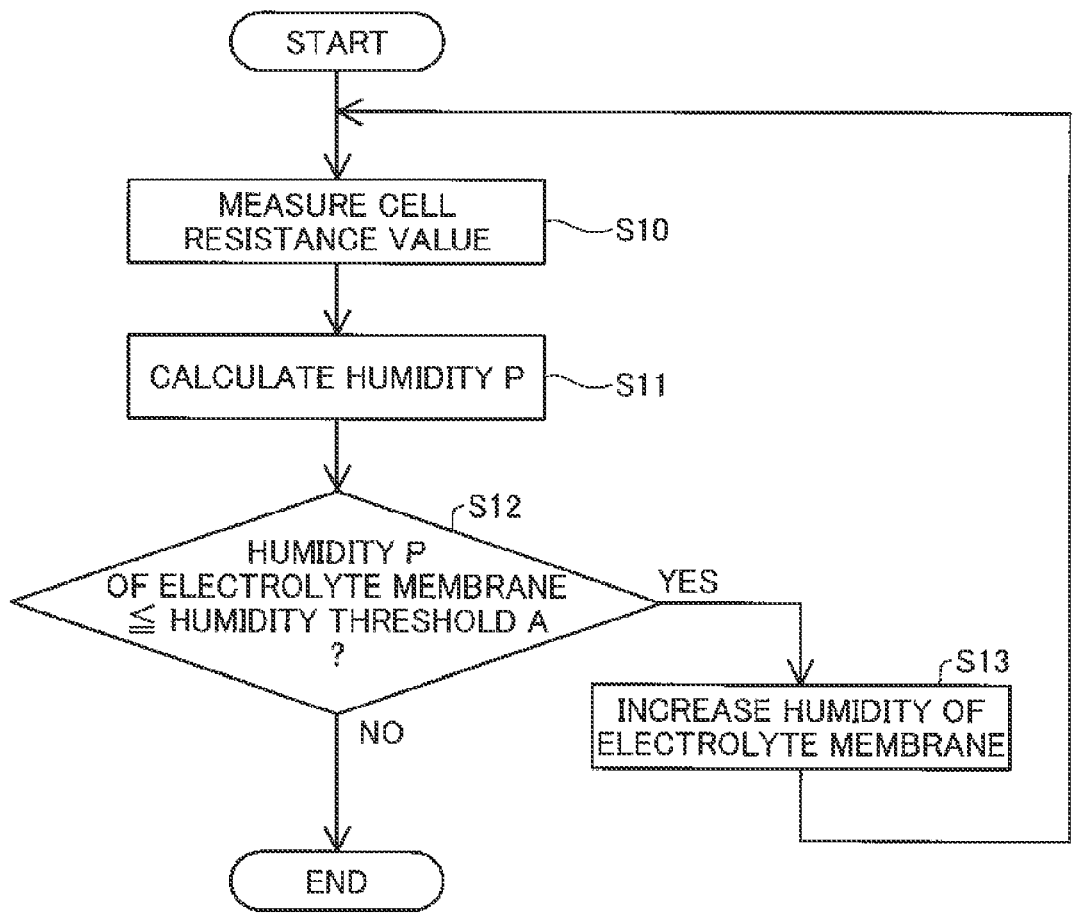
FIG. 5 is a flowchart showing the wet state control process according to the first embodiment.

FIG. 5 is a flowchart showing the wet state control process according to the first embodiment. The wet state control process is performed by the controller 150 and continually performed at predetermined intervals after a start of the fuel cell system.

The controller 150 obtains a cell resistance value measured by the resistance measurement unit 130 (step S10) and calculates a humidity P of the electrolyte membrane 112 based on the cell resistance value (step S11). The humidity P calculated here is a predicted value.

The controller 150 determines whether the humidity P of the electrolyte membrane 112 is equal to or less than a humidity threshold A (step S12). When the humidity P is equal to or less than the humidity threshold A (step S12: YES), the controller 150 determines that the dimensional change rate of the electrolyte membrane 112 is not greater than a predetermined value and performs a process of increasing the humidity of the electrolyte membrane 112 (step S13). The predetermined value is a dimensional change rate at which the electrolyte membrane 112 is unlikely to be damaged by the drying stress and is equal to 0% according to this embodiment. The humidity threshold corresponds to the "first threshold value" in the claims.

When the dimensional change rate of the electrolyte membrane 112 decreases below 0%, the tensile stress starts acting on the electrolyte membrane 112. Setting the humidity before application of the tensile stress to the electrolyte membrane 112 or during application of the stress allowable by the electrolyte membrane 112 to the humidity threshold A enables the electrolyte membrane 112 to be humidified before application of the tensile stress to the electrolyte membrane 112. According to the first embodiment, the humidity threshold A is 43% RH which is the humidity at the dimensional change rate of the electrolyte membrane 112 equal to 0%. The humidity threshold A is preferably specified by the humidity in the humidity range S2 including the humidity of the electrolyte membrane 112 at which the dimensional change rate of the electrolyte membrane 112 is equal to 0%. In the humidifying process using water produced by power generation of the cell 110, the humidity range S2 is a humidity range correlated to the range of the dimensional change rate corresponding to strain generated before an increase in humidity by the power generation process. According to the first embodiment, the humidity range S2 is a humidity range of the electrolyte membrane 112 when the dimensional change rate of the electrolyte membrane 112 is in the change rate range S1 (−1.5% to +9.0%). This range is described below.

In the humidifying process using water produced by power generation of the cell 110 (wet state control process), an upper limit and a lower limit of the change rate range S1 (range of dimensional change rate) corresponding to strain generated before an increase in humidity by the power generation process may be calculated by the following procedure. The upper limit is described first. The procedure converts a humidity change into a dimensional change to calculate a dimensional change rate a (%/sec) of the electrolyte membrane 112 per unit time and multiplies this dimensional change rate a per unit time by a time period b from a start of power generation for the humidifying process to an actual increase in humidity (a×b). The dimensional change of the electrolyte membrane 112 is likely to increase at the higher temperature of the electrolyte membrane 112. At a relatively high temperature, for example, 80 degrees, of the electrolyte membrane 112, the dimensional change rate a of the electrolyte membrane 112 per unit time is 0.225%/sec. The time period from the start of power generation of the cell 110 for the humidifying process to the effect of a humidity increase is experimentally 40 sec. Accordingly the upper limit of the predetermined range is 9.0% as given below. The time period b=40 sec is relatively long as the time period from the start of power generation for the humidifying process to the effect of the temperature increase.

$$a \times b = 0.225\%/\text{sec} \times 40 \text{ sec} = 9.0\%$$

The lower limit of the predetermined range is described next. In general, when the tensile stress is equal to or less than a yield stress, the resin material is unlikely to be damaged. In this embodiment, the dimensional change rate of the electrolyte membrane 112 under application of a tensile stress which is 1/5 of the yield stress to the electrolyte membrane 112 is the lower limit of the change rate range S1.

The yield stress ($\sigma y$) of the electrolyte membrane 112 used according to the first embodiment is 6 MPa, so that the tensile stress ($\sigma$) which is 1.5 of the yield stress is 1.2 MPa. The Young's modulus (E) of the electrolyte membrane 112 used according to the first embodiment is 80 MPa in measurement with a tensile tester in the state of the temperature of 80° C. and the humidity of 15% RH. The strain ($\epsilon$) of the electrolyte membrane 112 is accordingly given as: $\epsilon = \sigma/E = 1.2$ MPa/80 MPa=0.015. The dimensional change rate of the electrolyte membrane 112 herein is shown by expressing the strain ($\epsilon$) by percentage and adding the plus or minus sign according to the type of the stress (the plus sign+ in the case of compression stress and the minus sign—in the case of tensile stress). The dimensional change rate at the tensile stress of 1.2 MPa, i.e., the lower limit of the change rate range S1, is accordingly equal to −1.5%.

The process of increasing the humidity of the electrolyte membrane 112 may be a method of increasing the current value of the cell 110 to increase the amount of water produced by power generation of the fuel cell and thereby increase the water content of the electrolyte membrane 112. In this case, for example, the humidity of the electrolyte membrane 112 can be increased by the simple control of increasing the current value to 0.5 A/cm$^2$. Alternatively the temperature of the cell 110 may be decreased. More specifically, for example, a method may decrease the cell temperature via a cooling device with energy of a battery of the fuel cell system 10. The decrease in cell temperature causes vapor condensation and thereby increases the humidity of the electrolyte membrane 112. Another method may increase the gas stoichiometric ratio to increase the humidity of the electrolyte membrane 112. This enables efficient supply of the humidified gas to the electrolyte membrane. Yet another method may increase the back pressure of the cathode to increase the humidity of the electrolyte membrane 112. Increasing the back pressure of the cathode facilitates vapor condensation at the cathode and thereby increases the humidity of the electrolyte membrane 112.

When the humidity P is greater than the humidity threshold A (step S12: NO), the controller 150 terminates the process.

In the fuel cell system 10 of the first embodiment described above, the wet state of the solid polymer electrolyte membrane 112 is controlled, such that the dimensional change rate of the electrolyte membrane 112 in the planar direction accompanied with expansion and shrinkage of the electrolyte membrane 112 becomes equal to or greater than the predetermined value. This suppresses cracking and thinning of the electrolyte membrane 112 due to the tensile stress by drying and improves the durability of the electrolyte membrane 112.

In the fuel cell system 10 of the first embodiment, when the humidity of the electrolyte membrane 112 decreases to or below the humidity (humidity threshold A) at the dimensional change rate of the electrolyte membrane 112 equal to 0%, the control procedure of the wet state of the electrolyte membrane 112 increase the humidity of the electrolyte membrane 112, so as to make the dimensional change rate of the electrolyte membrane equal to or greater than 0%. This suppresses tensile stress from being applied to the electrolyte membrane 112, due to excessive drying of the electrolyte membrane 112. This accordingly suppresses cracking and thinning of the electrolyte membrane 112 and improves the durability of the electrolyte membrane.

In the fuel cell system 10 of the first embodiment, the electrolyte membrane 112 is humidified when the dimensional change rate of the electrolyte membrane 112 is within the change rate range S1 including 0%. This suppresses the tensile stress caused by excessive drying of the electrolyte membrane 112 from being applied to the electrolyte membrane 112. This accordingly suppresses cracking and thinning of the electrolyte membrane 112 and improves the durability of the electrolyte membrane 112.

In the fuel cell system 10 of the first embodiment, the humidity threshold A is specified by the humidity of the electrolyte membrane within the humidity range S2 when the dimensional change rate of the electrolyte membrane 112 is in the change rate range S1 (−1.5% to +9.0%). There is a correlation between the humidity of the electrolyte membrane 112 and the dimensional change rate of the electrolyte membrane 112. When the humidity decreases below the humidity threshold, the electrolyte membrane 112 may be deformed and damaged by drying. The procedure of this embodiment controls the wet state of the electrolyte membrane 112 before application of tensile stress or under application of tensile stress that is unlikely to damage the electrolyte membrane 112, thus suppressing the electrolyte membrane 112 from being damaged.

B. Second Embodiment

The correlation between the humidity and the dimensional change rate varies depending on the temperature. A second embodiment changes the humidity threshold according to the temperature of the fuel cell.

B1. General Configuration of Fuel Cell System

Figure 6:
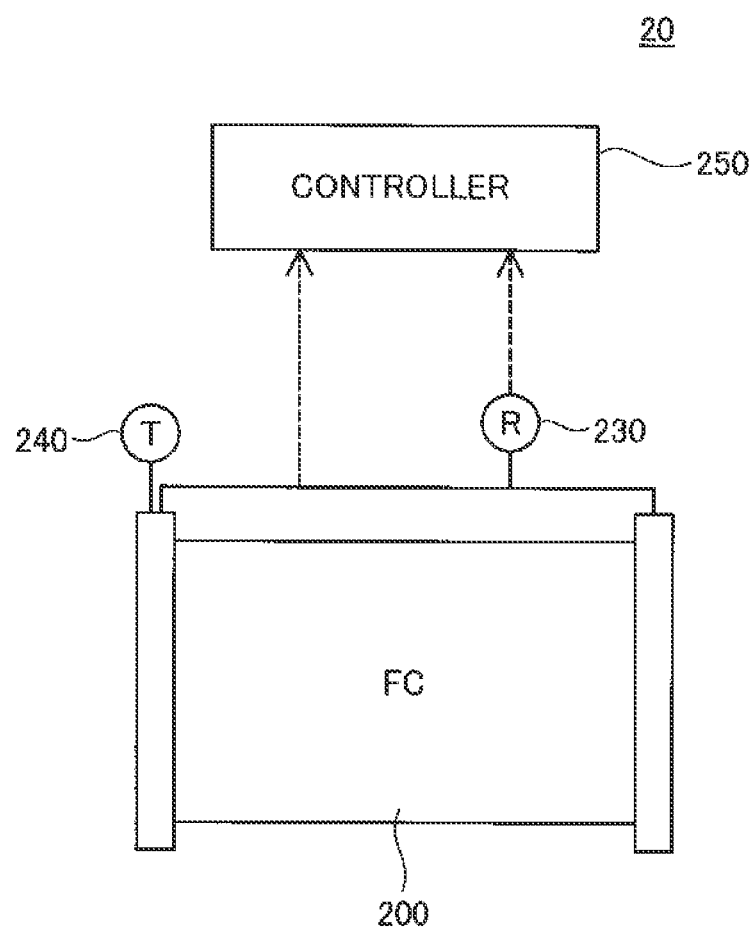
FIG. 6 illustrates the general configuration of a fuel cell system 20 according to the second embodiment.

FIG. 6 illustrates the general configuration of a fuel cell system 20 according to the second embodiment. The fuel cell system 20 includes a fuel cell stack 200, a controller 250, a resistance measurement unit 230 and a temperature sensor 240. The controller 250 controls power generation of the fuel cell stack 200, in response to an external demand. The controller 250 performs a wet state control process of controlling the wet state of electrolyte membranes placed in the fuel cell stack 200, as one of operating controls of the fuel cell stack 200. The fuel cell stack 200 and the resistance measurement unit 230 of the second embodiment have the same functions and configurations as those of the fuel cell stack 100 and the resistance measurement unit 230 of the first embodiment. The same electrolyte membranes as those of the first embodiment are placed in the fuel cell stack 200, so that the electrolyte membranes of the second embodiment are also expressed by the same symbol as that of the first embodiment, i.e., as electrolyte membranes 112.

The temperature sensor 240 is connected with the fuel cell stack 200 to measure the temperature of the fuel cell stack 200. The temperature sensor 240 may be connected, for example, with any of the cells in the fuel cell stack 200 or with a terminal (not shown). In the description herein, it is assumed that the temperature of the fuel cell stack 200 is equal to the temperature of the electrolyte membrane 112, so that the temperature of the fuel cell stack 200 may be shown as the temperature of the electrolyte membrane 112. The temperature sensor 240 corresponds to the "temperature detector" in the claims.

The controller 250 obtains the temperature of the fuel cell from the temperature sensor 240 and changes the humidity threshold A based on the dimensional change rate of the electrolyte membrane 112 according to the temperature. In the second embodiment, the controller 250 sets the humidity at the dimensional change rate of the electrolyte membrane 112 equal to 0%, which varies depending on the temperature of the electrolyte membrane 112, to the humidity threshold A.

The controller 250 also calculates the humidity of the electrolyte membrane 112 based on the resistance value of the fuel cell stack 200 measured by the resistance measurement unit 230 and controls the wet state of the electrolyte membrane 112, based on the calculated humidity and the changed humidity threshold A.

B2. Temperature and Dimensional Change Rate

Figure 7A:
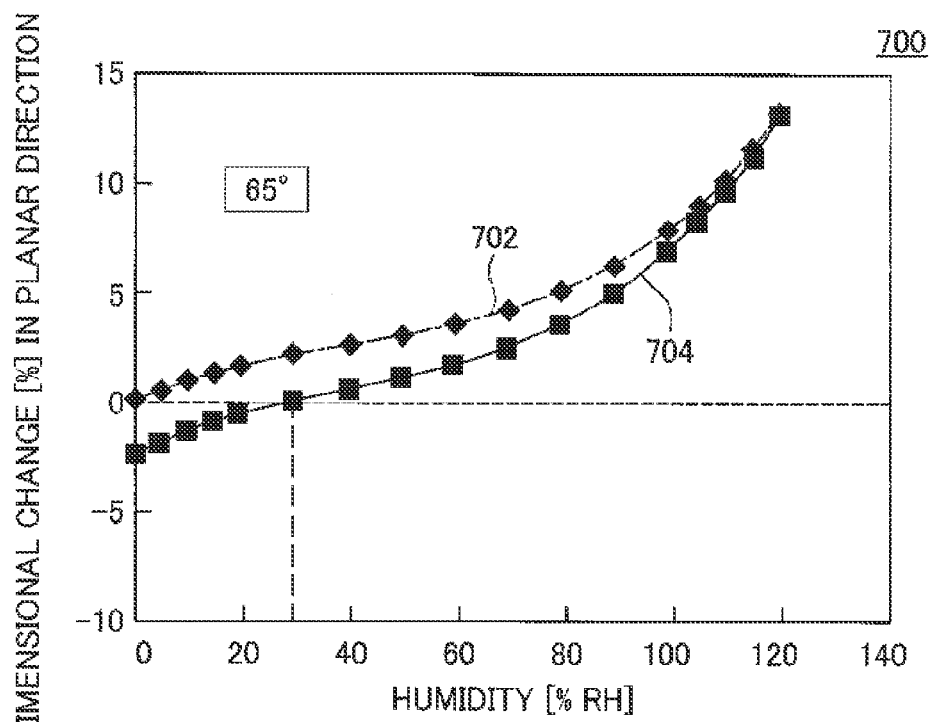
FIGS. 7A and 7B are dimensional change graphs 700 and 710 showing the correlation between the humidity and the dimensional change rate with respect to the temperature of the electrolyte membrane.
Figure 7B:
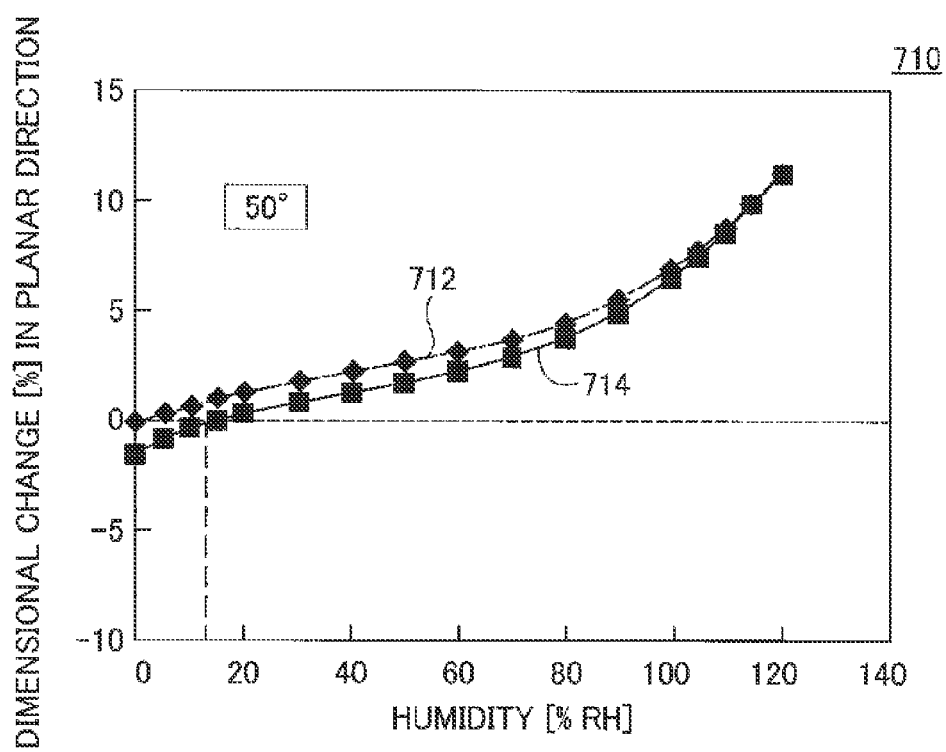

FIGS. 7A and 7B are dimensional change graphs 700 and 710 showing the correlation between the humidity and the dimensional change rate with respect to the temperature of the electrolyte membrane. The ordinate and the abscissa of the dimensional change graph 700 shown in FIG. 7A and the dimensional change graph 710 shown in FIG. 7B are the same as those of the dimensional change graph 600. The dimensional change graph 700 shows variations in dimensional change rate when the temperature of the electrolyte membrane 112 is 65° C., and the dimensional change graph 710 shows variations in dimensional change rate when the temperature of the electrolyte membrane 112 is 50° C. These graphs show variations in dimensional change rate of the electrolyte membrane in the course of state transitions of repeating the wet state and the dry state of the electrolyte membrane 112 by repetition of the humidifying process and the drying process of the electrolyte membrane 112. Dimensional change curves 702 and 712 show dimensional change tendencies of the electrolyte membrane 112 in a first state transition, and dimensional change curves 704 and 714 show dimensional change tendencies of the electrolyte membrane 112 in a second or subsequent state transition.

As shown by the dimensional change curve 704, at the temperature of the electrolyte membrane 112 equal to 65° C., when the humidity of the electrolyte membrane 112 decreases to or below 30% RH, the dimensional change rate decreases to or below 0% and causes tensile stress to be applied to the electrolyte membrane 112. As shown by the dimensional change curve 714, at the temperature of the electrolyte membrane 112 equal to 50° C., when the humidity decreases to or below 13% RH, the dimensional change rate decreases to or below 0% and causes tensile stress to be applied to the electrolyte membrane 112.

As described above, the humidity at which the dimensional change rate of the electrolyte membrane 112 is equal to 0% in the state transition from the wet state to the dry state differs according to the temperature of the electrolyte membrane 112. For example, at the temperature of the electrolyte membrane 112 equal to 65° C., the humidity threshold A is changed to 30% RH, while at the temperature of the electrolyte membrane 112 equal to 50° C., the humidity threshold A is changed to 13% RH.

B3. Wet State Control Process

Figure 8:
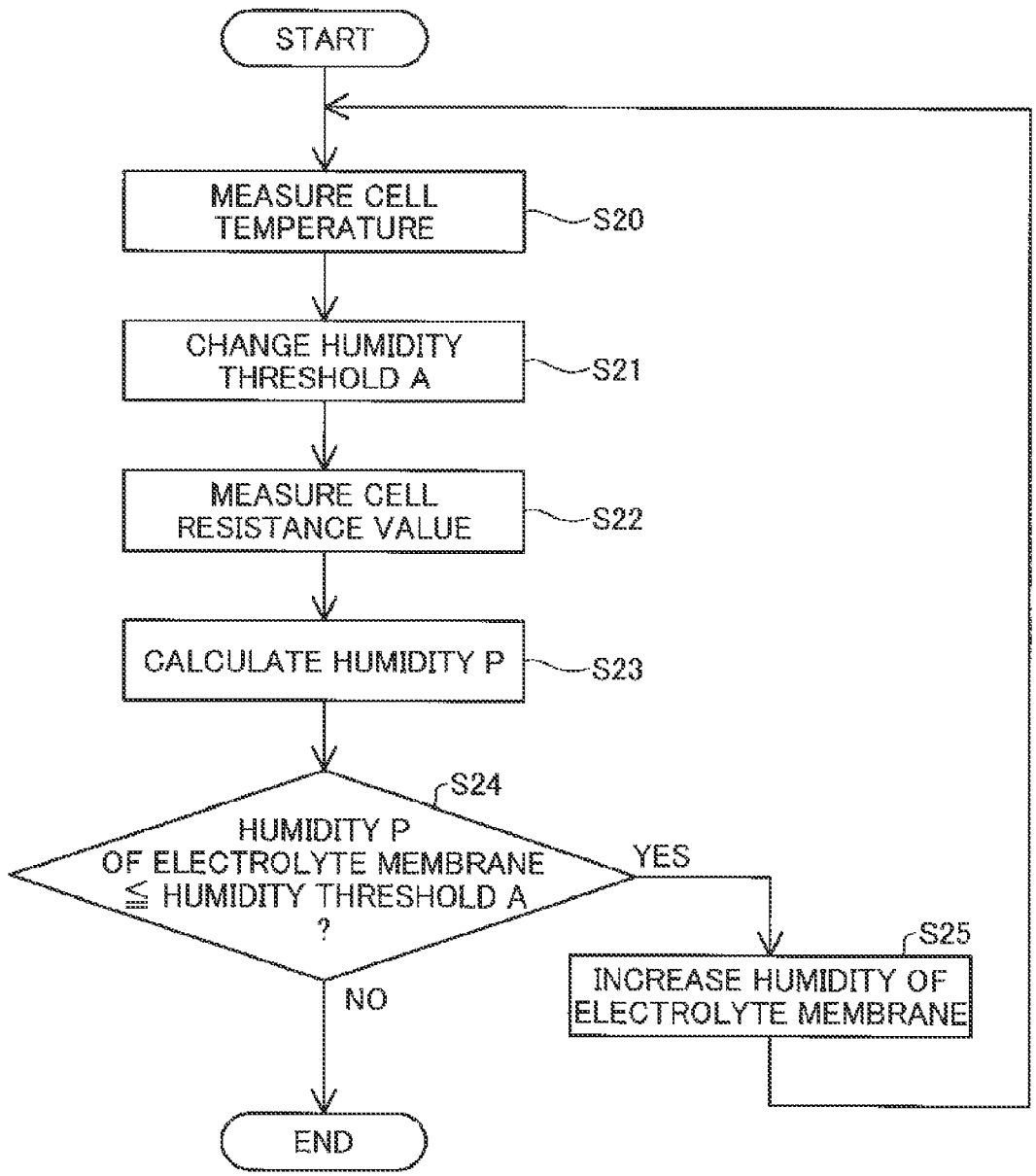
FIG. 8 is a flowchart showing the wet state control process according to the second embodiment.

FIG. 8 is a flowchart showing the wet state control process according to the second embodiment. The wet state control process is performed by the controller 250.

The controller 250 obtains the temperature of the fuel cell stack 200 from the temperature sensor 240 (step S20) and changes the humidity threshold A according to the temperature (step S21). More specifically, the controller 250 has a humidity threshold map according to the temperature of the electrolyte membrane 112, refers to the humidity threshold map, adequately specifies the humidity threshold corresponding to the temperature of the electrolyte membrane 112 and changes the humidity threshold A to the specified humidity threshold.

Figure 9:
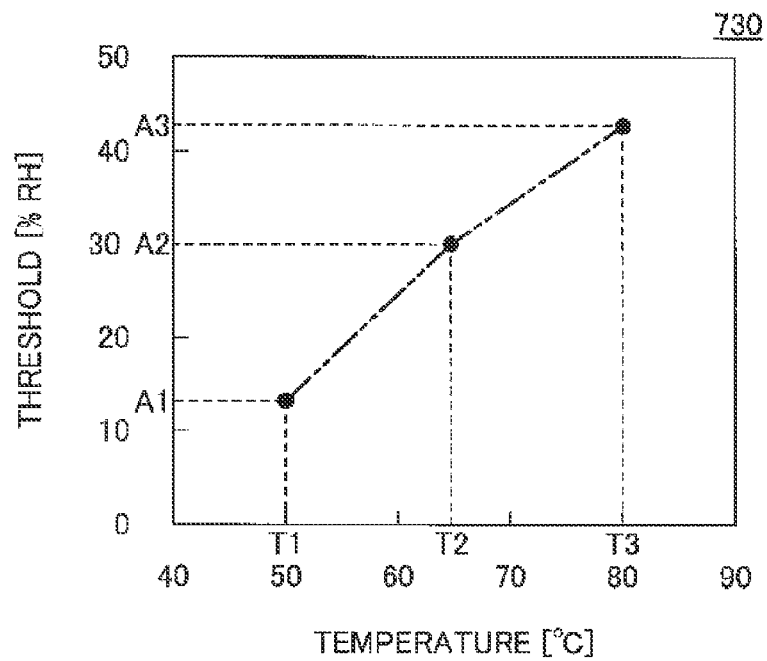
FIG. 9 is a diagram illustrating a humidity threshold map 730 according to the second embodiment.

FIG. 9 is a diagram illustrating a humidity threshold map 730 according to the second embodiment. In the humidity threshold map 730, the ordinate shows the humidity threshold (unit: % RH) and the abscissa shows the temperature (unit: ° C.) of the electrolyte membrane 112. The humidity threshold map 730 is provided in advance based on the temperature, the humidity and the dimensional change rate of the electrolyte membrane 112 and shows the humidities to give the dimensional change rate of the electrolyte membrane 112 equal to 0% at the respective temperatures. As shown in the humidity threshold map 730, the humidity threshold of the electrolyte membrane 112 gradually increases with a temperature increase of the electrolyte membrane 112. For example, in the humidity threshold map 730, the humidity threshold at a temperature T1 (50° C.) is equal to A1 (13% RH), the humidity threshold at a temperature T2 is equal to A2 (30% RH), and the humidity threshold at a temperature of 80° C. is equal to A3 (43% RH). The humidity threshold map 730 is stored in advance in the controller 250.

The controller 250 obtains the cell resistance value measured by the resistance measurement unit 230 (step S22) and calculates the humidity P of the electrolyte membrane 112 based on the cell resistance value (step S23).

The controller 250 determines whether the humidity P of the electrolyte membrane 112 is equal to or less than the changed humidity threshold A (step S24). When the humidity P is equal to or less than the humidity threshold A (step S24: YES), the controller 250 determines that the dimensional change rate of the electrolyte membrane 112 is not greater than a predetermined value and performs a process of increasing the humidity of the electrolyte membrane 112 (step S25).

When the humidity P is greater than the humidity threshold A (step S24: NO), the controller 250 terminates the process.

In the fuel cell system of the second embodiment described above, the humidity threshold is changed according to the temperature of the electrolyte membrane 112. This enables the humidifying process of the electrolyte membrane 112 based on the adequate humidity threshold corresponding to the temperature of the electrolyte membrane 112, thus improving the durability of the electrolyte membrane 112.

C. Third Embodiment

The humidity of the electrolyte membrane 112 is correlated to the cell resistance value, and the cell resistance value is correlated to the stack voltage of the fuel cell stack. Accordingly, the humidity of the electrolyte membrane 112 is correlated to the stack voltage via the cell resistance value. A third embodiment performs control of humidifying the electrolyte membrane according to the stack voltage of the fuel cell stack.

C1. General Configuration of Fuel Cell System

Figure 10:
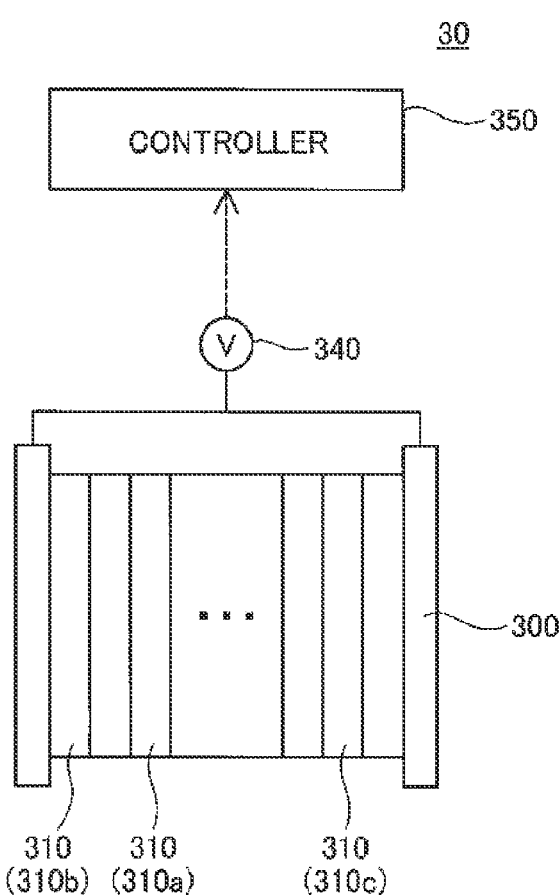
FIG. 10 illustrates the general configuration of a fuel cell system 30 according to the third embodiment.

FIG. 10 illustrates the general configuration of a fuel cell system 30 according to the third embodiment. The fuel cell system 30 includes a fuel cell stack 300, a controller 350 and a voltage measurement unit 340. The controller 350 controls the operation of the fuel cell stack 300, in response to an external demand. The controller 350 controls the wet state of the electrolyte membrane 112 as one of operating controls of the fuel cell stack 300. The fuel cell stack 300 of the third embodiment has the same functions and configurations as those of the fuel cell stack 100 of the first embodiment. The same electrolyte membranes as those of the first embodiment are placed in the fuel cell stack 300, so that the electrolyte membranes of the third embodiment are also expressed by the same symbol as that of the first embodiment, i.e., as electrolyte membranes 112.

The fuel cell stack 300 has a plurality of cells 310. According to the third embodiment, a cell 310a is a cell having the highest resistance value to an identical stack voltage among the plurality of cells 310 constituting the fuel cell stack 300. In other words, the cell 310a is most likely to be dried among the plurality of cells 310 constituting the fuel cell stack 300.

The voltage measurement unit 340 is connected with the fuel cell stack 300 to measure the stack voltage of the fuel cell stack 300. The voltage measurement unit 340 may be provided in any of the cells or may be provided in one or a plurality of cells. The voltage measurement unit 340 corresponds to the "voltage detector" in the claims. The stack voltage is substantially equal to the cell voltage.

The controller 350 obtains the stack voltage from the voltage measurement unit 340 and performs a process of controlling the wet state of the electrolyte membrane 112 based on the obtained stack voltage and a preset voltage threshold. The voltage threshold of the third embodiment is described with reference to FIG. 11. The voltage threshold corresponds to the second threshold value in the claims.

C2. Voltage Threshold

Figure 11:
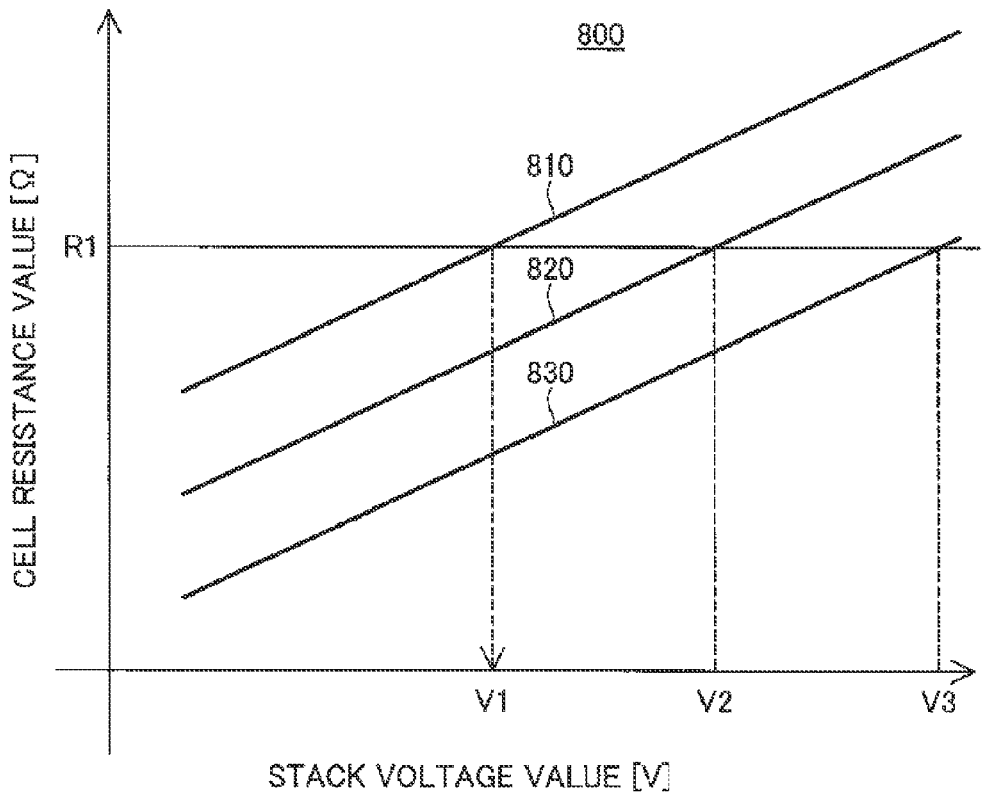
FIG. 11 is a voltage-resistance graph 800 showing the correlation between the stack voltage value and the cell resistance value according to the third embodiment.

FIG. 11 is a voltage-resistance graph 800 showing the correlation between the stack voltage value and the cell resistance value according to the third embodiment. In the voltage-resistance graph 800, the ordinate shows the cell resistance value (unit: Ω), and the abscissa shows the stack voltage (unit: V). A voltage resistance curve 810 shows a relationship between the cell resistance value and the stack voltage value of the cell 310a which is most likely to be dried among the cells 310 constituting the fuel cell stack 310. A voltage resistance curve 820 shows a relationship between the cell resistance value and the stack voltage value of a cell 310b. A voltage resistance curve 830 shows a relationship between the cell resistance value and the stack voltage value of a cell 310c.

The cell resistance value is correlated to the humidity of the electrolyte membrane 112 as described above. An increase in cell resistance value reduces the power generation efficiency of the fuel cell and decreases the amount of water produced by power generation, so as to decrease the humidity of the electrolyte membrane 112. In the voltage-resistance graph 800, a cell resistance value R1 indicates a resistance value at the humidity of the electrolyte membrane 112 equal to 43% RH, in other words, a resistance value at the dimensional change rate of the electrolyte membrane 112 equal to 0%, when the temperature of the fuel cell stack 300 is 80° C. When the resistance value of the cell 310a becomes equal to or greater than R1, the humidity of the electrolyte membrane 112 decreases to or below 43% RH, so that tensile stress acts on the electrolyte membrane 112. In the third embodiment, a stack voltage value V1 at the cell resistance value of R1 is accordingly set to a voltage threshold V. When the voltage threshold V is a stack voltage value V2 or V3 based on the cell resistance value of another cell 310b or 310c at which the cell resistance value is the resistance value R1, the electrolyte membrane 112 of the cell 310a may be dried excessively and damaged by tensile stress.

C3. Wet State Control Process

Figure 12:
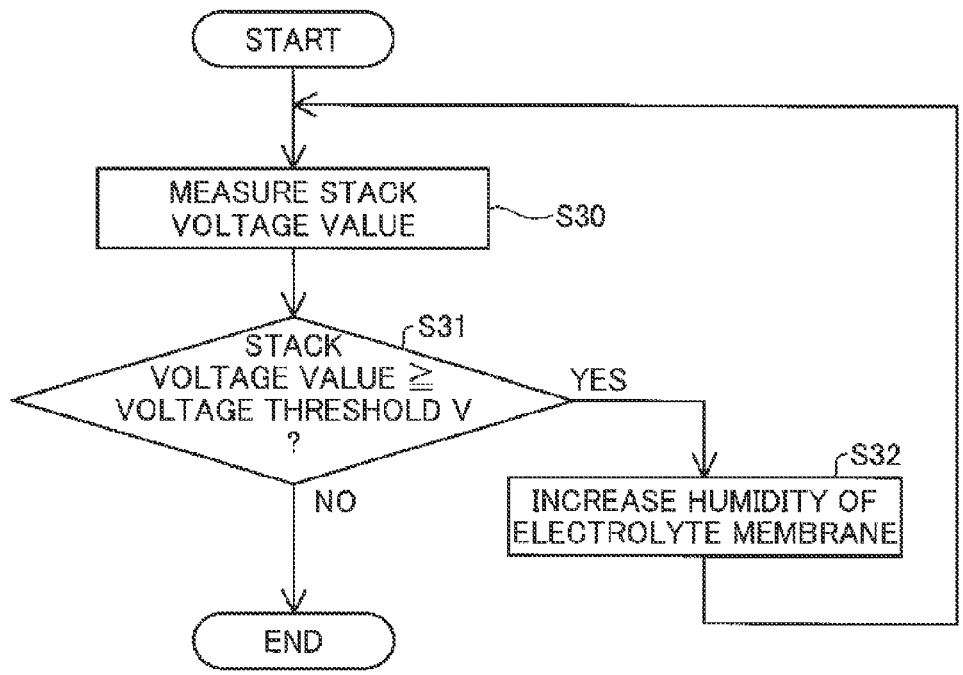
FIG. 12 is a flowchart showing the wet state control process according to the third embodiment.

FIG. 12 is a flowchart showing the wet state control process according to the third embodiment. The wet state control process is performed by the controller 350.

The controller 350 obtains the stack voltage value of the fuel cell stack 300 from the voltage measurement unit 340 (step S30) and determines whether the voltage value of the fuel cell stack 300 is equal to or greater than the voltage threshold V (step S31). When the obtained voltage value is equal to or greater than the voltage threshold V (step S31: YES), the controller 350 determines that the dimensional change rate of the electrolyte membrane 112 is not greater than a predetermined value and performs a process of increasing the humidity of the electrolyte membrane 112 (step S32).

When the obtained voltage value is less than the voltage threshold V (step S31: NO), the controller 350 terminates this process.

In the fuel cell system 30 of the third embodiment described above, the electrolyte membrane 112 is humidified when the stack voltage value is equal to or greater than the voltage threshold V, which is the voltage value of the fuel cell when the dimensional change rate of the electrolyte membrane is −1.5% to +9% (0% in the third embodiment). This readily suppresses the tensile stress caused by drying of the electrolyte membrane 112 from being applied to the electrolyte membrane 112, based on the stack voltage value.

D. Fourth Embodiment

According to the first to the third embodiments, the timing of control of the wet state of the electrolyte membrane 112 (humidification control) is determined, based on the elasto-plasticity of the electrolyte membrane 112. The stress acting on the electrolyte membrane 112 and strain generated in the electrolyte membrane 112, however, differ in the case of calculation based on the elasto-plasticity of the electrolyte membrane 112 and in the case of calculation based on the viscoelastic property of the electrolyte membrane 112. According to a fourth embodiment, the timing of humidification control is determined, based on the viscoelastic property of the electrolyte membrane 112. The fourth embodiment has a similar system configuration to that of the fuel cell system 20 of the second embodiment, and the same symbols as those of the second embodiment are used for the description. The fourth embodiment, however, has a different wet state control process performed by the controller 250. The wet state control process will be described later.

D1. Stress and Strain Acting on Electrolyte Membrane

Figure 13A:
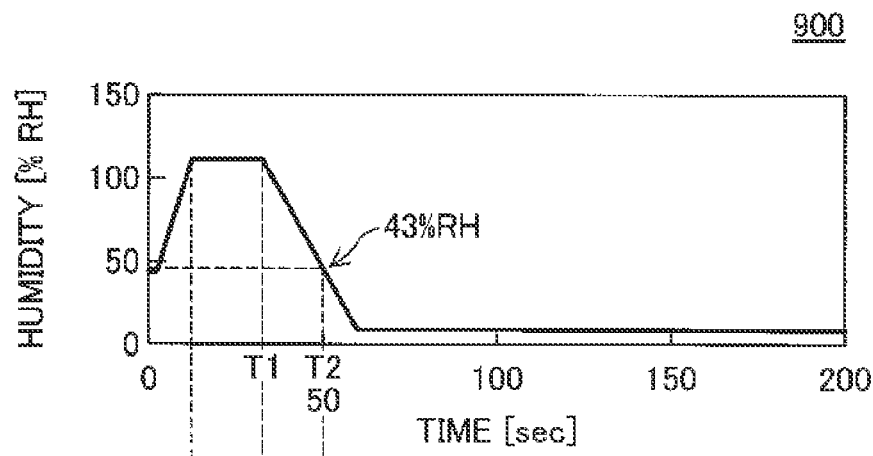
FIGS. 13A and 13B are diagrams showing stress and strain acting on the electrolyte membrane 112 based on the viscoelastic property of the electrolyte membrane 112 according to the fourth embodiment.
Figure 13B:
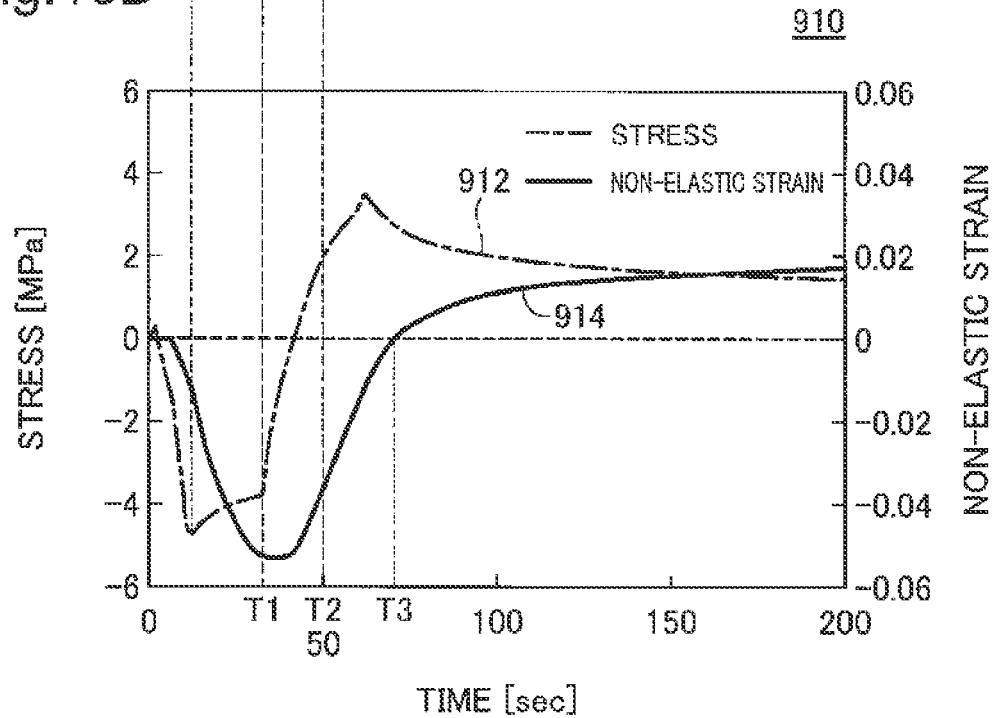

FIGS. 13A and 13B are diagrams showing stress and strain acting on the electrolyte membrane 112 based on the viscoelastic property of the electrolyte membrane 112 according to the fourth embodiment. FIGS. 13A and 13B show the calculation results of stress and strain against a change in humidity of the electrolyte membrane 112 when the humidity of the electrolyte membrane 112 is changed from 110% RH to 10% RH in about 30 seconds under the condition that the temperature of the fuel cell is 80° C. A humidity change graph 900 of FIG. 13A shows a change in humidity of the electrolyte membrane 112 with time elapsed, and a stress-strain graph 910 of FIG. 13B shows changes in stress and non-elastic strain of the electrolyte membrane 112 with time elapsed. In FIG. 13A, the ordinate shows the humidity (unit: % RH), and the abscissa shows the time elapsed (unit: sec). In FIG. 13B, the left side of the ordinate shows the stress (unit: MPa) acting on the electrolyte membrane 112, the right side of the ordinate shows the non-elastic strain acting on the electrolyte membrane 112, and the abscissa shows the time elapsed (unit: sec).

Figure 14:
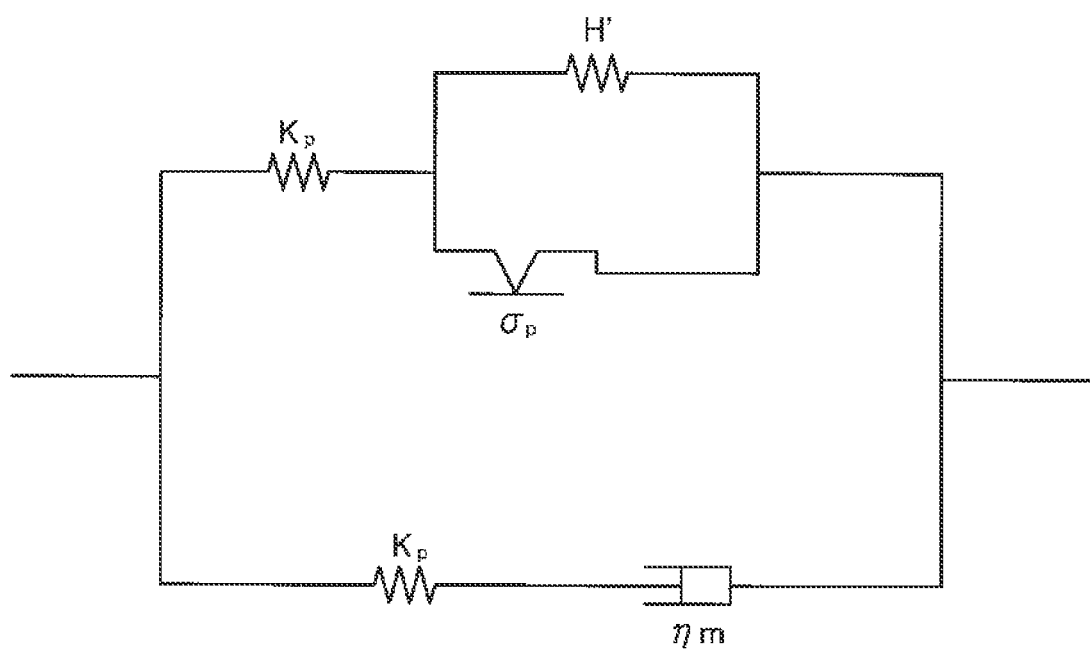
FIG. 14 shows a model representing the mechanical properties of the electrolyte membrane.

In the fifth embodiment, the stress acting on the electrolyte membrane 112 and the non-elastic strain by the stress are calculated by using a dynamic model of the electrolyte membrane 112 shown in FIG. 14 and Expressions 2 to 5 below. FIG. 14 shows a model representing the mechanical properties of the electrolyte membrane.

$$\sigma = \sigma_p + \sigma_v \quad \text{(Expression 2)}$$

$$\sigma_p = K_p \varepsilon \quad \text{(Expression 3)}$$
$$\text{if } \sigma_p \leq \sigma_y$$

$$\sigma_p = K_p \varepsilon + H'\left(\varepsilon - \frac{\sigma_y}{K_p}\right) \quad \text{(Expression 4)}$$
$$\text{if } \sigma_p \geq \sigma_y$$

$$\sigma_v = A^{-\frac{1}{n}} \cdot \dot{\varepsilon}^{\frac{1}{n}} \text{ (Norton-Hoff rate law)} \quad \text{(Expression 5)}$$

As described in the first embodiment, in calculation of the strain of the electrolyte membrane 112 caused by the tensile stress acting on the electrolyte membrane 112, based on the elasto-plasticity of the electrolyte membrane 112, tensile stress acts on the electrolyte membrane 112 and causes tensile strain at the humidity of the electrolyte membrane equal to 43% RH as shown in FIG. 13A. As shown by a stress graph 912 of FIG. 13B, on the other hand, about 2 MPa of tensile stress acts on the electrolyte membrane 112 at a time T2 when the humidity of the electrolyte membrane 112 is 43% RH. As shown by a non-elastic strain graph 914, the non-elastic strain is about −0.04 at the time T2, which indicates that compression strain remains in the electrolyte membrane 112. This is attributed to the following reason.

The electrolyte membrane 112 is expanded in the wet state, so that compression stress acts in the planar direction of the electrolyte membrane 112 to cause compression strain. In the course of gradual state transition of the electrolyte membrane 112 from the wet state to the dry state, compression stress is reduced and is changed to tensile stress. It takes a certain time for this stress change. The strain generated in the electrolyte membrane 112 is also gradually changed from compression strain to tensile strain, but it takes a longer time for this strain change than that for the stress change. Accordingly, as shown in FIG. 13B, at a time T3 after elapse of about 20 seconds from the time T2, the non-elastic strain increases to or above 0 and the strain is changed from compression strain to tensile strain. This causes a change in shape of the electrolyte membrane 112. There is accordingly a time delay of a predetermined time (about 20 seconds in the fourth embodiment) between the time when the dimensional change rate of the electrolyte membrane 112 actually becomes 0% and the time when tensile strain is generated in the electrolyte membrane 112.

In the fourth embodiment, the start time of the humidifying process is delayed by this time delay, so as to suppress degradation of the fuel consumption and the power generation performance of the fuel cell by the humidifying process. By taking into account a response delay of starting the humidifying process after elapse of the predetermined time, it is preferable to set the predetermined time to a slightly shorter time (for example, 15 seconds) than the actual delay time (20 seconds in the graph 900).

D2. Wet State Control Process

Figure 15:
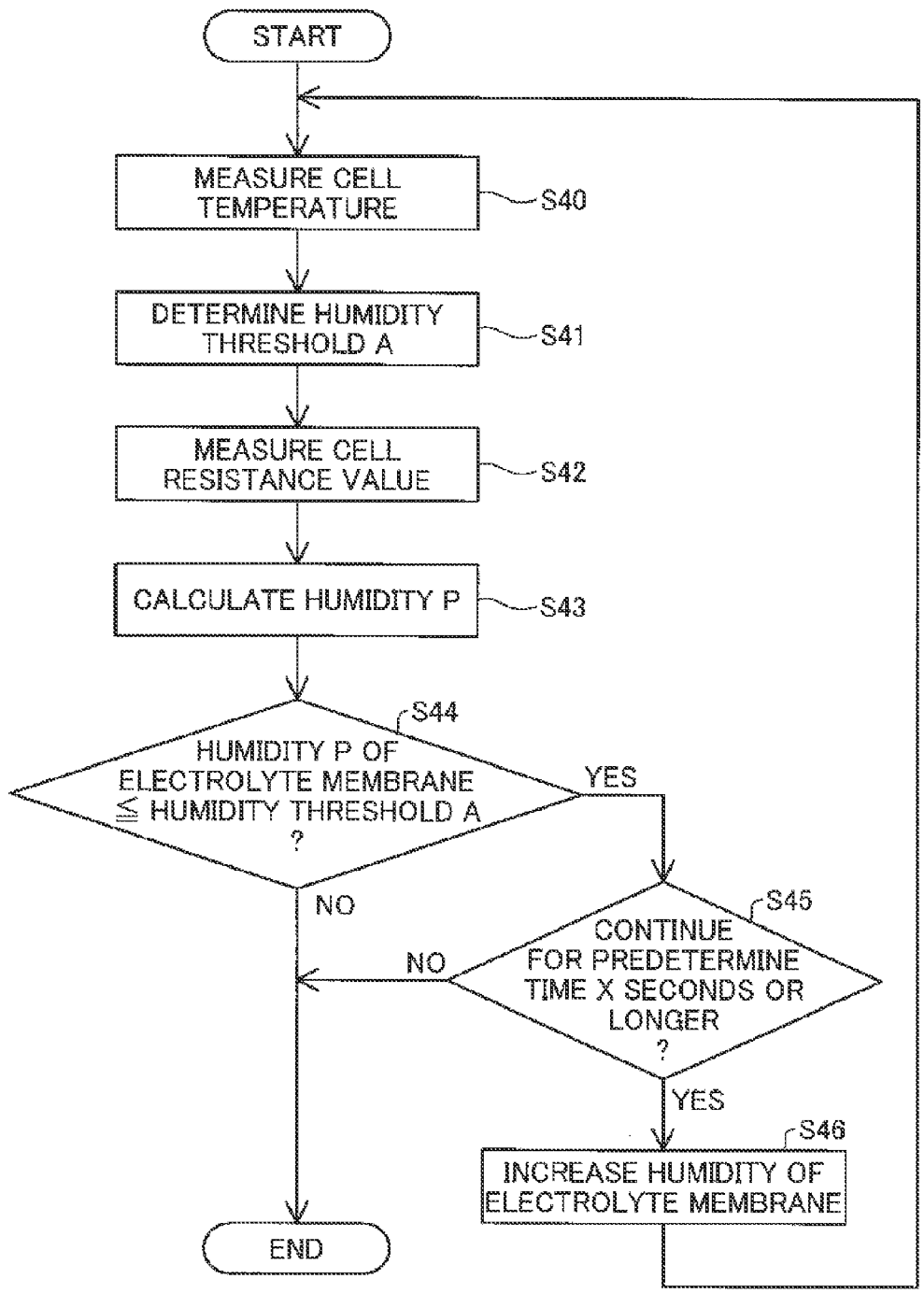
FIG. 15 is a flowchart showing the wet state control process according to the fourth embodiment.

FIG. 15 is a flowchart showing the wet state control process according to the fourth embodiment. The wet state control process is performed by the controller 250.

The controller 250 obtains the temperature of the fuel cell stack 200 from the temperature sensor 240 (step S40) and changes the humidity threshold A according to the temperature (step S41). Steps S40 to S41 are identical with steps S20 to S21 of the second embodiment.

The controller 250 obtains the cell resistance value of the cell 110 of the fuel cell stack 200 (step S42) and calculates the humidity P of the electrolyte membrane 112 (step S43). The controller 250 subsequently determines whether the humidity P of the electrolyte membrane 112 is equal to or less than the humidity threshold A (step S44). When the humidity P of the electrolyte membrane 112 is equal to or less than the humidity threshold A (step S44: YES), the controller 250 determines whether the state that the humidity P of the electrolyte membrane 112 is equal to or less than the humidity threshold A continues for a predetermined time X seconds or longer (step S45). When the state that the humidity P of the electrolyte membrane 112 is equal to or less than the humidity threshold A continues for the predetermined time X seconds or longer (step S45: YES), the controller 250 performs a process of increasing the humidity of the electrolyte membrane 112 (step S46).

When the humidity P of the electrolyte membrane 112 is greater than the humidity threshold A (step S44: NO) or when the state that the humidity P of the electrolyte membrane 112 is equal to or less than the humidity threshold A is released within the predetermined time X seconds, i.e., when the humidity P of the electrolyte membrane 112 becomes greater than the humidity threshold A within the predetermined time X seconds once decreasing to or below the humidity threshold A (step S45: NO), the controller 250 terminates this process.

In the fuel cell system of the fourth embodiment described above, the electrolyte membrane 112 is humidified when the state that the humidity of the electrolyte membrane 112 is equal to or less than the humidity threshold A continues for the predetermined time X seconds or longer. This provides a predetermined time delay prior to the start of the process of increasing the humidity after the humidity decreases to or below the humidity threshold A. This suppresses degradation of the power generation efficiency of the fuel cell and the energy loss associated with the process of increasing the humidity, thus improving the fuel consumption of the fuel cell.

E. Fifth Embodiment

As described above, the humidification control of the electrolyte membrane 112 is performed, in order to suppress tensile stress caused by excessive drying of the electrolyte membrane 112 from being applied to the electrolyte membrane 112. The respective embodiments described above, however, increase the current value of the fuel cell and thereby increase the amount of water produced by power generation of the fuel cell to humidify the electrolyte membrane 112. This causes the following problem.

The fuel cell starts power generation in the low load (high potential) state. This may waste a reactive gas (hydrogen-containing gas) and reduce the fuel consumption of the fuel cell. Additionally, the fuel cell has a potential change. This may accelerate degradation of platinum used as the catalyst and degrade the power generation performance of the fuel cell. Moreover, the fuel cell starts power generation in the dry state or in the almost dry state of the electrolyte membrane 112. This results in further inflow of the reactive gas in the dry state of the electrolyte membrane 112. This may cause mechanical tensile stress to act on the electrolyte membrane 112 and lead to cracking of the electrolyte membrane 112.

Due to the problem described above, in terms of the fuel consumption and the power generation performance of the fuel cell, it is preferable to delay the wet state control process (humidification control) as late as possible and minimize the frequency of the wet state control processes. According to the fifth embodiment, the predetermined time X at step S45 in the wet state control process of the fourth embodiment is adjusted, based on a change in humidity per unit time of the electrolyte membrane 112 and the humidity of the electrolyte membrane 112 after the change.

E1. Humidity-Tensile Stress Correlation Map

Figure 16:
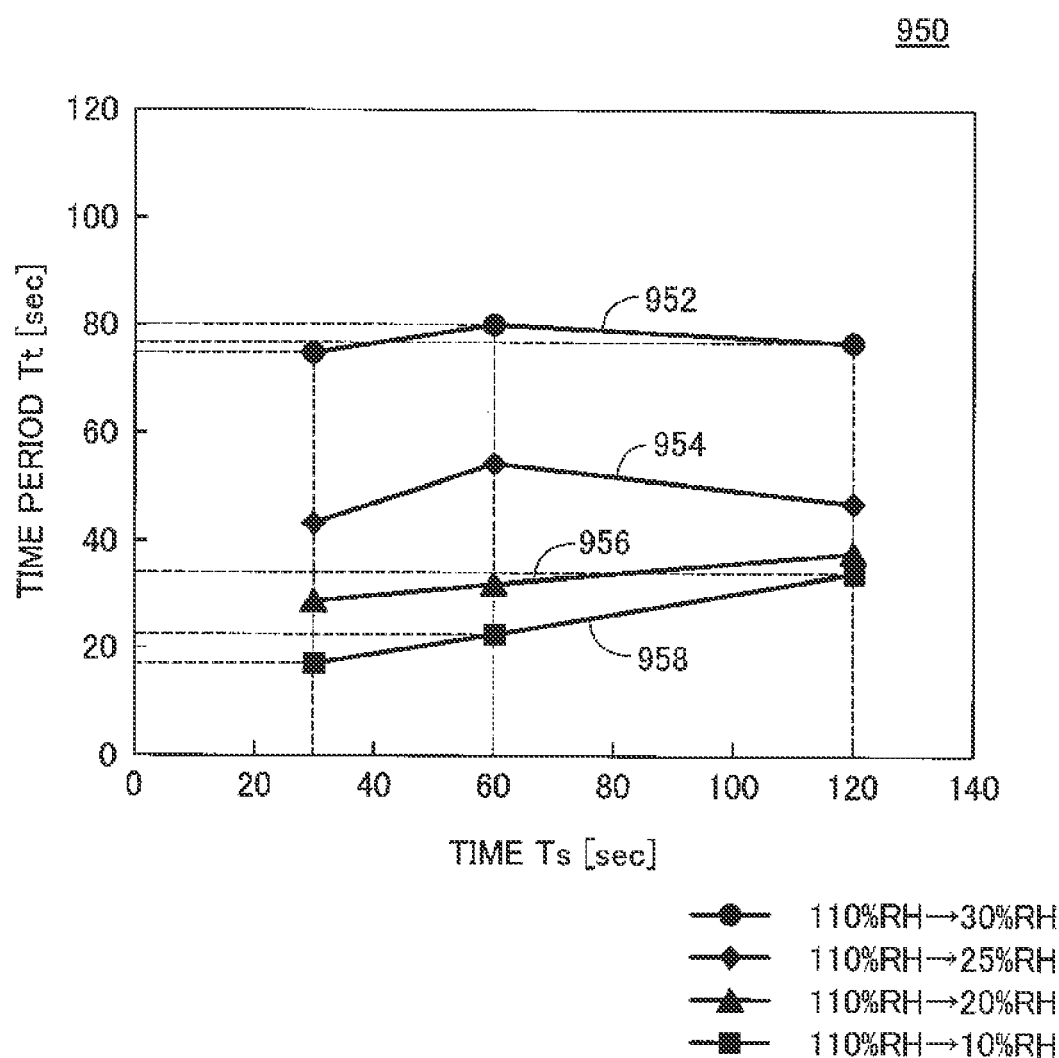
FIG. 16 is a map 950 showing a relationship between a time Ts required for a change of the humidity of the electrolyte membrane 112 and a time period Tt from the time when the humidity becomes equal to or less than the humidity threshold to the time when tensile stress starts acting.

FIG. 16 is a map 950 showing a relationship between a time Ts required for a change of the humidity of the electrolyte membrane 112 and a time period Tt from the time when the humidity becomes equal to or less than the humidity threshold to the time when tensile stress starts acting. In the map 950, the ordinate shows the time period (delay time) Tt (unit: sec) from the time when the humidity becomes equal to or less than the humidity threshold to the time when tensile stress starts acting, and the abscissa shows the time (required time) Ts (unit: sec) required for a change of the humidity. A graph 952 shows a variation in delay time Tt when the humidity of the electrolyte membrane 112 change from 110% RH to 30% RH. A graph 954 shows a variation in delay time Tt when the humidity of the electrolyte membrane 112 change from 110% RH to 25% RH. A graph 956 shows a variation in delay time Tt when the humidity of the electrolyte membrane 112 change from 110% RH to 20% RH. A graph 958 shows a variation in delay time Tt when the humidity of the electrolyte membrane 112 change from 110% RH to 10% RH.

As shown in the map 950, on the assumption that it takes an identical time for a state change from the wet state to the dry state, the higher humidity after the state change to the dry state (hereinafter referred to as after-change humidity) results in the longer delay time Tt before tensile stress starts acting on the electrolyte membrane 112. For example, when it takes 60 seconds for a change from the wet state to the dry state, the delay time Tt is about 80 seconds in the graph 952 (where the after-change humidity is 30% RH) and decreases in the sequence of the graph 954 (where the after-change humidity is 25% RH), the graph 956 (where the after-change humidity is 20% RH) and the graph 958 (where the after-change humidity is 10% RH). In other words, the lower after-change humidity of the electrolyte membrane 112 results in the shorter time period from the time when the humidity becomes equal to or less than the humidity threshold to the time when tensile stress starts acting on the electrolyte membrane 112.

The smaller change in humidity per unit time (the longer required time Ts) also results in the longer time period from the time when the humidity becomes equal to or less than the humidity threshold to the time when tensile stress starts acting on the electrolyte membrane 112. For example, in the graph 958, for the required time Ts=30 seconds required for a change of the humidity, the delay time Tt=17 seconds before a start of acting tensile stress; for the required time Ts=60 seconds, the delay time Tt=22 seconds; and for the required time Ts=120 seconds, the delay time Tt=33 seconds.

The after-change humidity of the electrolyte membrane 112 is specified in advance according to various conditions, for example, the type of the electrolyte membrane 112. In the wet state control process, the predetermined time X is adjusted appropriately by referring to the map 950, based on the after-change humidity and the time required for a state change from the wet state to the dry state. The time required for a state change from the wet state to the dry state also differs by the operating temperature of the fuel cell. The predetermined time X may thus be adjusted, based on the operating temperature of the fuel cell, in addition to the after-change humidity and the time required for a state change from the wet state to the dry state.

In the fuel cell system of the fifth embodiment described above, the predetermined time X is specified, based on at least one of the change in humidity per unit time of the electrolyte membrane and the humidity of the electrolyte membrane after the change in humidity. Accordingly, the predetermined time from the time when the humidity of the electrolyte membrane becomes equal to or less than the first threshold value to the time when the humidification control starts can be set flexibly. This suppresses degradation of the power generation efficiency of the fuel cell and the energy loss associated with the humidification control and improves the fuel consumption of the fuel cell.

F. Modifications

F1. Modification 1

In the second embodiment, the temperature sensor 240 is provided on the end plate. The temperature sensor 240 may, however, be provided on any of the respective cells constituting the fuel cell stack 200 or may be provided on each of the cells. In an application of providing the temperature sensors 240 on a plurality of cells, the highest measured temperature among the measured values of the respective temperature sensors 240 may be used, or the average value of the measured temperatures may be used. Using the plurality of temperature sensors improves the measurement accuracy of the temperature.

F2. Modification 2

The setting of the humidity threshold may be changed dynamically by taking into account the degradation over time and the installation environment in addition to the conditions for manufacture of the electrolyte membrane 112. This enables the wet state control process with the more adequate humidity threshold A, thus not only improving the durability of the electrolyte membrane 112 but suppressing degradation of the fuel consumption and the power generation performance of the fuel cell.

F3. Modification 3

The third embodiment predicts the humidity by using the pre-measured cell resistance value. In one modification, the resistance measurement unit 130 may be provided on a plurality of cells, and the humidity may be calculated based on the highest resistance value among a plurality of obtained resistance values. The dry state of the electrolyte membrane 112 proceeds with an increase in resistance value. Modification 3 can thus calculate the humidity of the electrolyte membrane 112 expected to be in the driest state. This accordingly suppresses all the electrolyte membranes 112 placed in the fuel cell stack 300 from being excessively dried, thus suppressing degradation of the durability of the electrolyte membranes 112.

F4. Modification 4

In the various embodiments described above, the humidification control is performed for all the electrolyte membranes included in the fuel cell stack, based on the condition of the electrolyte membrane 112 placed in a certain cell 110. In one modification, the wet state control process may be performed individually for each of the electrolyte membranes 112 placed in the respective cells 110. This humidifies the electrolyte membrane that needs humidification, while avoiding unnecessary humidifying process, thus suppressing degradation of the power generation performance and the fuel consumption of the fuel cell.

F5. Modification 5

The third embodiment performs the wet state control process based on only the cell voltage value. In one modification, a process of changing the voltage threshold according to the temperature of the electrolyte membrane may be additionally performed. The voltage of the fuel cell is correlated to the resistance value of the fuel cell, and the humidity calculated from the resistance value is correlated to the temperature of the electrolyte membrane 112. Accordingly, changing the voltage threshold according to the temperature of the electrolyte membrane enables the humidifying process of the electrolyte membrane to be performed based on the adequate voltage threshold according to the temperature of the electrolyte membrane. This improves the durability of the electrolyte membrane.

F6. Modification 6

The first embodiment controls the operation of the fuel cell in various ways, in order to humidify the electrolyte membrane 112. In one modification, the reactive gas supplied to the fuel cell may be humidified with a humidifier, and the water content of the electrolyte membrane 112 may be increased via the reactive gas, so as to increase the humidity of the electrolyte membrane 112.

F7. Modification 7

The first embodiment describes the upper limit of the change rate range S1 in the state that the temperature of the fuel cell stack is 80° C. In one modification, the upper limit may be set by taking into account the temperature of the electrolyte membrane 112. The dimensional change rate a of the electrolyte membrane 112 per unit times is 0.0382%/sec in the case that the temperature of the electrolyte membrane 112 is a relatively low temperature, for example, 55 degrees. On the assumption of the time period b=40 seconds from a start of power generation of the cell 110 for the humidifying process to the effect of a temperature increase, the upper limit of the change rate range S1 is specified to be 1.5% as shown below:

$$a \times b = 0.0382\%/\text{sec} \times 40\ \text{sec} = 1.5\%$$

F8. Modification 8

In the first embodiment, the humidity at the dimensional change rate of 0% is specified as the humidity threshold A. In another modification, the controller 150 may control the wet state of the electrolyte membrane to have a dimensional change rate of not less than the level under application of tensile stress unlikely to damage the material (electrolyte membrane). The dimensional change rate under application of tensile stress unlikely to damage the material (electrolyte membrane) is within the range of not less than −1.5% and less than 0% as described in the first embodiment. Such setting enables the controller 150 to have a predetermined time from application of tensile stress to the electrolyte membrane 112 to a start of control of the wet state. This suppresses degradation of the power generation performance of the fuel cell system, while suppressing damage of the electrolyte membrane 112.

F9. Modification 9

Control of the wet state of the electrolyte membrane 112 includes control of decreasing the humidity of the electrolyte membrane 112. The control of decreasing the humidity of the electrolyte membrane 112 may be performed, for example, by a method of decreasing the current value of the cell 110 to reduce the amount of water produced by power generation of the fuel cell stack 100 and thereby decrease the water content of the electrolyte membrane 112. Another method may increase the temperature of the cell 110. An increase in cell temperature heats the produced water and thereby decreases the humidity of the electrolyte membrane 112. Yet another method may reduce the gas stoichiometric ratio to decrease the humidity of the electrolyte membrane 112. Another method may reduce the back pressure of the cathode to decrease the humidity of the electrolyte membrane 112.

The foregoing describes various embodiments of the invention. The invention is, however, not limited to these embodiments but may be implemented by various other aspects without departing from the scope of the invention.

The invention claimed is:

1. A fuel cell system comprising:
a fuel cell configured to have a solid polymer electrolyte membrane;
a controller configured to control the fuel cell; and
an acquirer configured to obtain information on humidity of the electrolyte membrane, wherein
when the humidity of the electrolyte membrane is equal to or less than a threshold value for a predetermined time, the controller is programmed to control a wet state of the electrolyte membrane such that a dimensional change rate of the electrolyte membrane, which is a change rate in area in a planar direction of the electrolyte membrane accompanied with expansion or contraction of the electrolyte membrane, is equal to or greater than a predetermined value which is greater than a dimensional change rate corresponding to a state in which the electrolyte membrane is damaged by tensile stress applied to the electrolyte membrane by drying of the electrolyte membrane,
the threshold value is specified by a humidity range of the electrolyte membrane when the dimensional change rate of the electrolyte membrane is −1.5% to 0%, and
the predetermined time is a predetermined time period from a time when the dimensional change rate of the electrolyte membrane becomes equal to 0% to a time when the dimensional change rate of the electrolyte membrane becomes less than 0%.

2. The fuel cell system according to claim 1, wherein the predetermined value is 0%.

3. The fuel cell system according to claim 2, wherein the controller is configured to control the wet state of the electrolyte membrane, such that the dimensional change rate is equal to or greater than the predetermined value and equal to or less than +9.0%.

4. The fuel cell system according to claim 1, wherein the predetermined value is −1.5%.

5. The fuel cell system according to claim 1, wherein the predetermined value is specified by the dimensional change rate within a predetermined range including the dimensional change rate of the electrolyte membrane equal to 0%.

6. The fuel cell system according to claim 1, wherein the threshold value differs by temperature,
the fuel cell system further comprising:
a temperature detector configured to detect a temperature of the electrolyte membrane, wherein
the controller is configured to change the threshold value based on the temperature of the electrolyte membrane.

7. The fuel cell system according to claim 1, further comprising:
a map showing a relationship between a time required for a change in humidity of the electrolyte membrane and a time period from a time when the humidity becomes equal to or less than the threshold value to a time when tensile stress starts acting on the electrolyte membrane, wherein
the predetermined time is specified based on at least one of a change in humidity of the electrolyte membrane per unit time and a humidity of the electrolyte membrane after the change in humidity and the map.

8. The fuel cell system according to claim 1, wherein the controller is configured to control the wet state of the electrolyte membrane by controlling parameters relating to power generation performance.

9. A fuel cell system comprising:
a fuel cell configured to have a solid polymer electrolyte membrane;
a controller configured to control the fuel cell;
a voltage detector configured to detect voltage of the fuel cell; and
a temperature detector configured to detect a temperature of the electrolyte membrane, wherein
when the voltage is equal to or greater than a threshold value, the controller is programmed to control a wet state of the electrolyte membrane such that a dimensional change rate of the electrolyte membrane, which is a change rate in area in a planar direction of the electrolyte membrane accompanied with expansion or contraction of the electrolyte membrane is equal to or greater than a predetermined value which is greater than a dimensional change rate corresponding to a state in which the electrolyte membrane is damaged by tensile stress applied to the electrolyte membrane by drying of the electrolyte membrane,
the threshold value is a voltage of the fuel cell when the dimensional change rate of the electrolyte membrane is −1.5% to 0%, and
the controller is configured to change the threshold value based on the temperature of the electrolyte membrane such that the controller is configured to control the wet state of the electrolyte membrane based on the voltage detected by the voltage detector and the temperature detected by the temperature detector.

10. The fuel cell system according to claim 9, wherein the controller is configured to control the wet state of the electrolyte membrane by controlling parameters relating to power generation performance.

11. In a fuel cell system comprising an electrolyte membrane, a control method of controlling a wet state of the electrolyte membrane, the control method comprising:
obtaining a dimensional change rate, which is a change rate in area in a planar direction of the electrolyte membrane accompanied with expansion and contraction of the electrolyte membrane;
obtaining information on humidity of the electrolyte membrane; and
when the humidity of the electrolyte membrane is equal to or less than a threshold value for a predetermined time, controlling the wet state of the electrolyte membrane such that the dimensional change rate is equal to or greater than a predetermined value, the predetermined value being greater than a dimensional change rate corresponding to a state in which the electrolyte membrane is damaged by tensile stress applied to the electrolyte membrane by drying of the electrolyte membrane, wherein
the threshold value is specified by a humidity range of the electrolyte membrane when the dimensional change rate of the electrolyte membrane is −1.5% to +9%, and
the predetermined time is a predetermined time period from a time when the dimensional change rate of the electrolyte membrane becomes equal to 0% to a time when the dimensional change rate of the electrolyte membrane becomes less than 0%.

12. In a fuel cell system comprising an electrolyte membrane, a control method of controlling a wet state of the electrolyte membrane, the control method comprising:
   obtaining a dimensional change rate, which is a change rate in area in a planar direction of the electrolyte membrane accompanied with expansion and contraction of the electrolyte membrane;
   detecting voltage of the fuel cell;
   detecting temperature of the electrolyte membrane;
   changing a threshold value based on temperature of the electrolyte membrane, wherein the threshold value is a voltage of the fuel cell when the dimensional change rate of the electrolyte membrane is −1.5% to 0%; and
   controlling the wet state of the electrolyte membrane when the voltage is equal to or greater than the threshold value such that the dimensional change rate is equal to or greater than a predetermined value, the predetermined value being greater than a dimensional change rate corresponding to a state in which the electrolyte membrane is damaged by tensile stress applied to the electrolyte membrane by drying of the electrolyte membrane.

* * * * *